US008605168B2

(12) United States Patent
Okada et al.

(10) Patent No.: US 8,605,168 B2
(45) Date of Patent: Dec. 10, 2013

(54) IMAGE CAPTURE DEVICE WITH FRAME RATE CORRECTION SECTION AND IMAGE GENERATION METHOD

(75) Inventors: Yusuke Okada, Osaka (JP); Sanzo Ugawa, Osaka (JP); Takeo Azuma, Kyoto (JP); Taro Imagawa, Osaka (JP)

(73) Assignee: Panasonic Corporation, Osaka (JP)

( * ) Notice: Subject to any disclaimer, the term of this patent is extended or adjusted under 35 U.S.C. 154(b) by 0 days.

(21) Appl. No.: 13/362,304

(22) Filed: Jan. 31, 2012

(65) Prior Publication Data

US 2012/0127337 A1 May 24, 2012

Related U.S. Application Data

(63) Continuation of application No. PCT/JP2011/003077, filed on Jun. 1, 2011.

(30) Foreign Application Priority Data

Jul. 8, 2010 (JP) ................................ 2010-155897

(51) Int. Cl.
*H04N 9/73* (2006.01)
(52) U.S. Cl.
USPC ..................... 348/223.1; 348/218.1; 348/335; 348/340
(58) Field of Classification Search
USPC .............................. 348/223.1, 218.1, 335, 340
See application file for complete search history.

(56) References Cited

U.S. PATENT DOCUMENTS

| 5,436,661 | A | * | 7/1995 | Yamamoto et al. | ............ 348/264 |
|---|---|---|---|---|---|
| 6,115,065 | A | * | 9/2000 | Yadid-Pecht et al. | ......... 348/308 |
| 8,018,500 | B2 | | 9/2011 | Azuma et al. | |
| 2004/0100574 | A1 | | 5/2004 | Voss et al. | |
| 2004/0155175 | A1 | * | 8/2004 | McNulty | .................... 250/208.1 |
| 2004/0234032 | A1 | * | 11/2004 | Nokita | ........................ 378/98.8 |
| 2004/0257440 | A1 | * | 12/2004 | Kondo et al. | .................. 348/94 |
| 2005/0157273 | A1 | * | 7/2005 | Collins et al. | .................. 353/84 |
| 2005/0219642 | A1 | * | 10/2005 | Yachida et al. | ............... 358/448 |

(Continued)

FOREIGN PATENT DOCUMENTS

| EP | 2175657 A1 | 4/2010 |
|---|---|---|
| JP | 2007-259428 A | 10/2007 |

(Continued)

OTHER PUBLICATIONS

International Search Report for corresponding International Application No. PCT/JP2011/003077 mailed Aug. 30, 2011.

(Continued)

*Primary Examiner* — Nicholas Giles
*Assistant Examiner* — Abdelaaziz Tissire
(74) *Attorney, Agent, or Firm* — Renner, Otto, Boisselle & Sklar, LLP

(57) ABSTRACT

An image capture device according to the embodiment of the present invention includes an image capture section 20 for reading a pixel signal of a first color component at a low frame rate and reading a pixel signal of a second color component at a high frame rate, and a frame rate correction section 22. The image capture section 20 performs non-destructive read of the pixel signal of the first color component in synchronization with the timing at which the pixel signal of the second color component is read during a charge accumulation time period defined by the first frame rate.

19 Claims, 22 Drawing Sheets

(56) References Cited

U.S. PATENT DOCUMENTS

| | | |
|---|---|---|
| 2006/0056515 A1* | 3/2006 | Kato et al. .............. 375/240.16 |
| 2006/0066554 A1* | 3/2006 | Baba et al. ..................... 345/98 |
| 2007/0070212 A1* | 3/2007 | Haneda ..................... 348/222.1 |
| 2009/0051793 A1* | 2/2009 | Smith .......................... 348/266 |
| 2009/0147120 A1 | 6/2009 | Kurane |
| 2009/0263044 A1 | 10/2009 | Imagawa et al. |
| 2010/0020217 A1* | 1/2010 | Abe et al. ..................... 348/308 |
| 2010/0079669 A1* | 4/2010 | Hattori et al. .............. 348/500 |
| 2010/0157149 A1* | 6/2010 | Nobori et al. .............. 348/453 |
| 2010/0315539 A1* | 12/2010 | Azuma et al. .............. 348/265 |
| 2011/0043670 A1 | 2/2011 | Azuma et al. |
| 2011/0216240 A1* | 9/2011 | Ohno .......................... 348/441 |
| 2012/0229677 A1* | 9/2012 | Ugawa et al. .............. 348/234 |

FOREIGN PATENT DOCUMENTS

| | | | |
|---|---|---|---|
| JP | 2008-199403 A | | 8/2008 |
| JP | 2008-211273 A | | 9/2008 |
| JP | WO2009011082 | * | 1/2009 |
| JP | WO2009019823 | * | 2/2009 |
| JP | 2009-272820 A | | 11/2009 |
| JP | 2010-074584 A | | 4/2010 |
| JP | 2010-114857 A | | 5/2010 |
| WO | 2008/047664 A1 | | 4/2008 |
| WO | 2009/019823 A | | 2/2009 |
| WO | 2009/019824 A | | 2/2009 |
| WO | 2010/090025 A1 | | 8/2010 |

OTHER PUBLICATIONS

Azuma et al., "A 2.⅔-inch 4K2K CMOS Image Sensor Based on Dual Resolution and Exposure Technique", Proceedings in IEEE International Solid-State Circuit Conference 2010, pp. 408-410 (or pp. 560-562), 2010.

Imagawa et al., "Video Reconstruction of Different Resolution and Exposure-Time Video Sequences for High-Resolution and Well-Exposed Video Imaging", Journal of the Institute of Image Information and Television Engineers, vol. 63, No. 8, pp. 1139-1148, 2009.

Co-pending U.S. Appl. No. 12/517,852, filed Jun. 5, 2009 (current claims and application provided).

Co-pending U.S. Appl. No. 12/914,273, filed Oct. 28, 2010 (application provided).

Extended European Search Report for corresponding European Application No. 11803270.5 issued on Aug. 19, 2013.

* cited by examiner

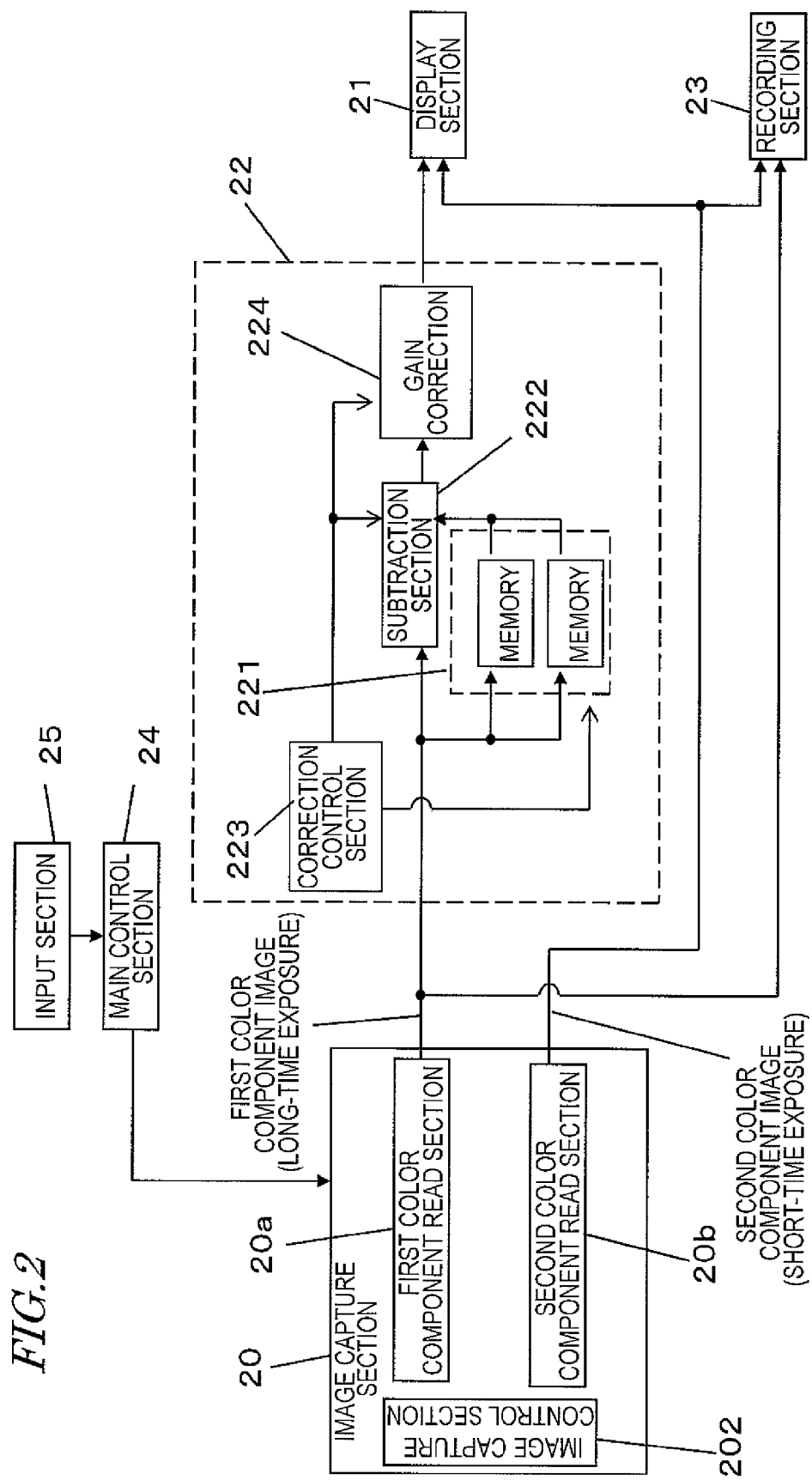

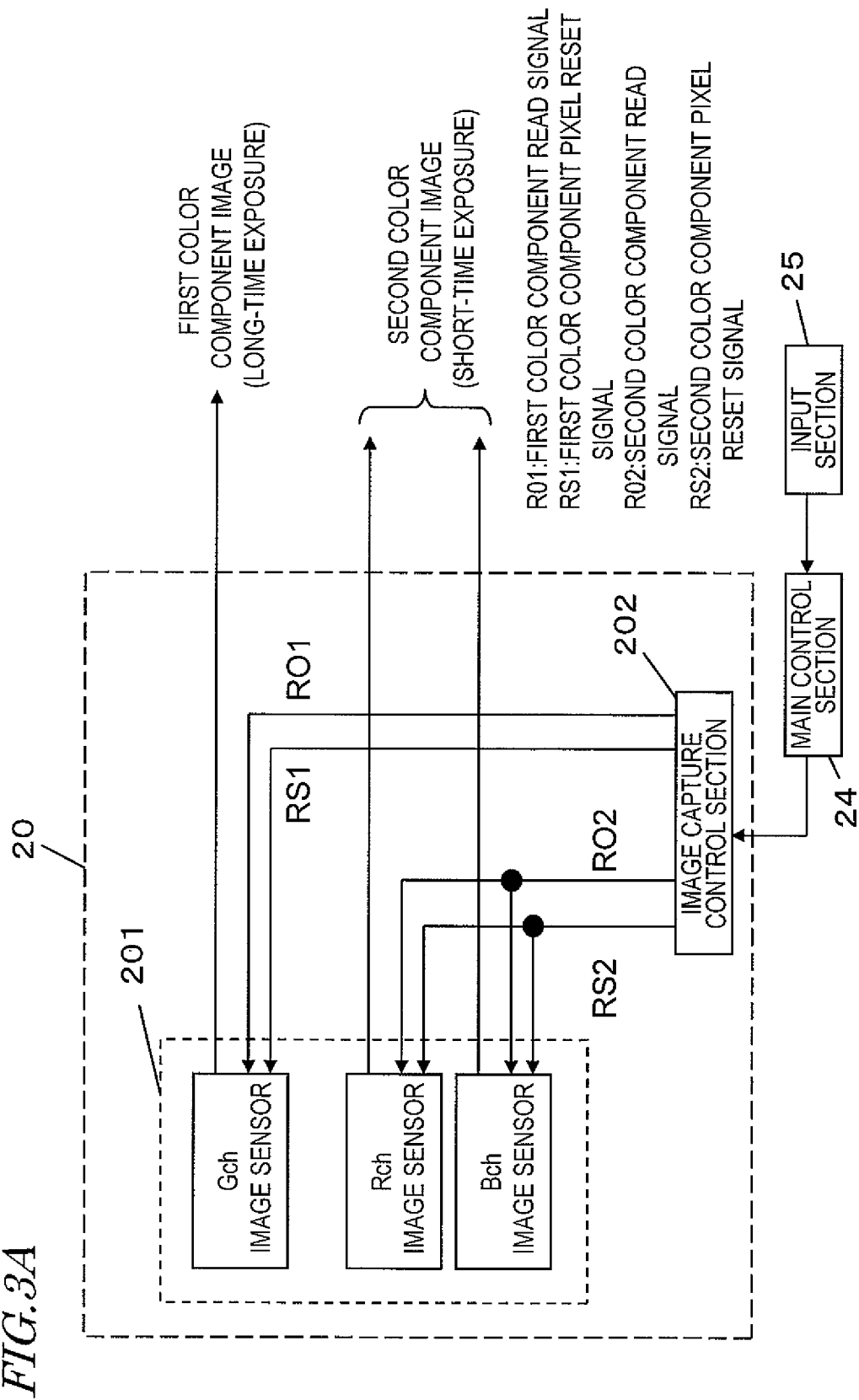

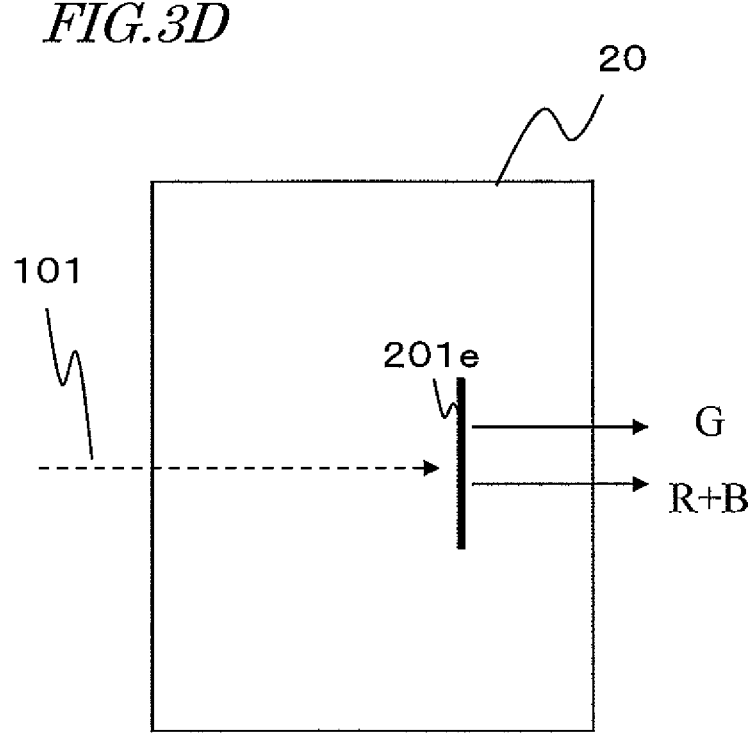

*FIG.5*
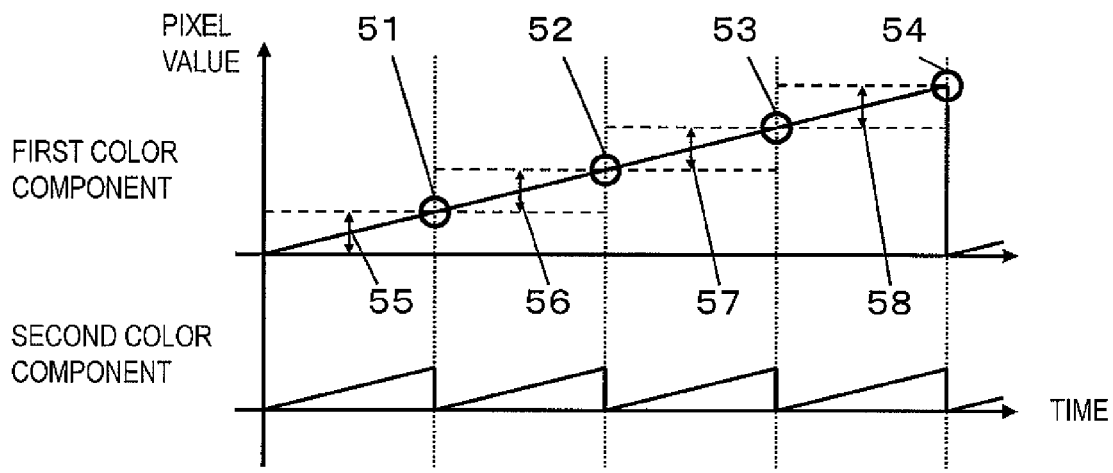
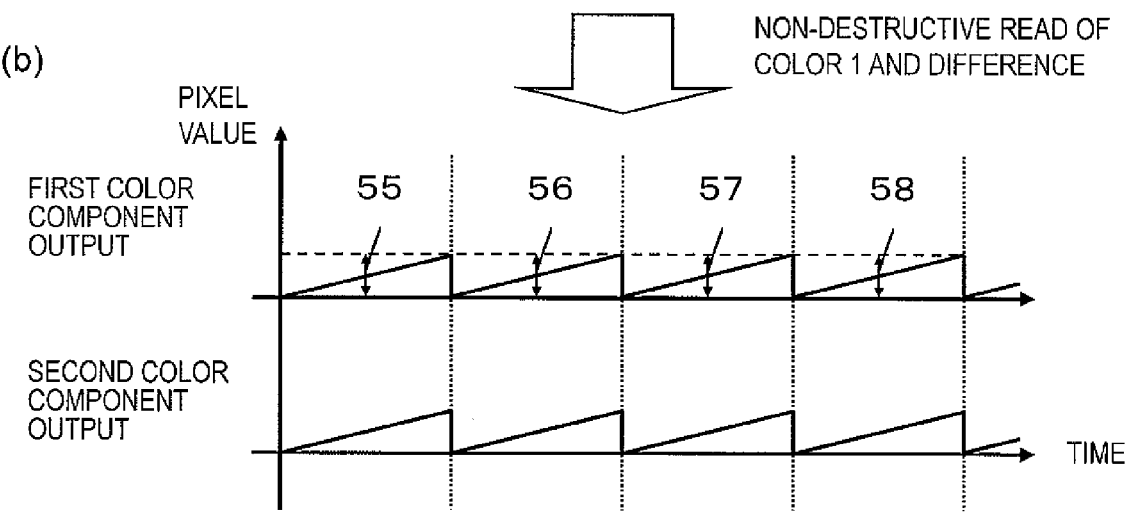

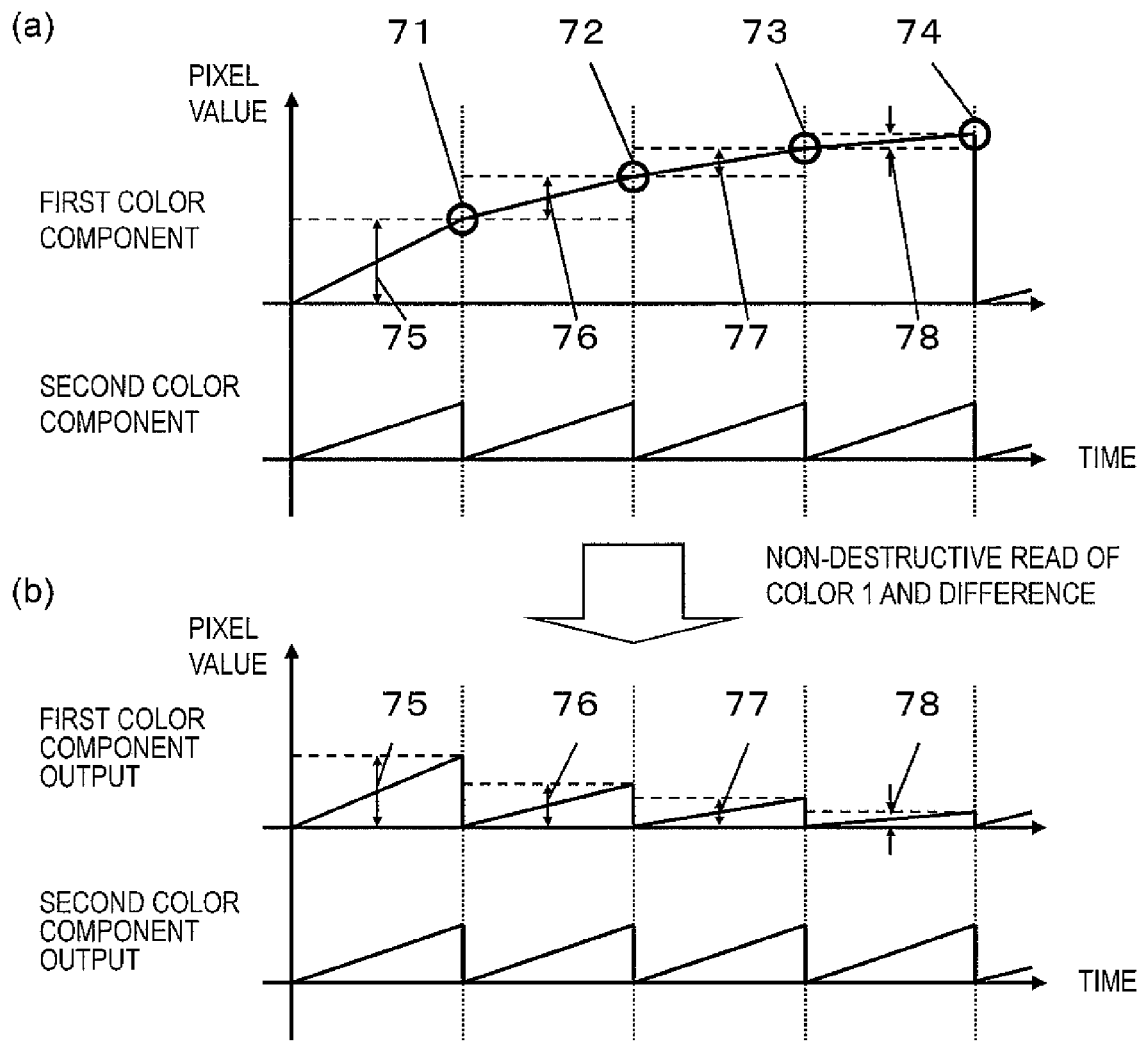

FIG.8
(a)
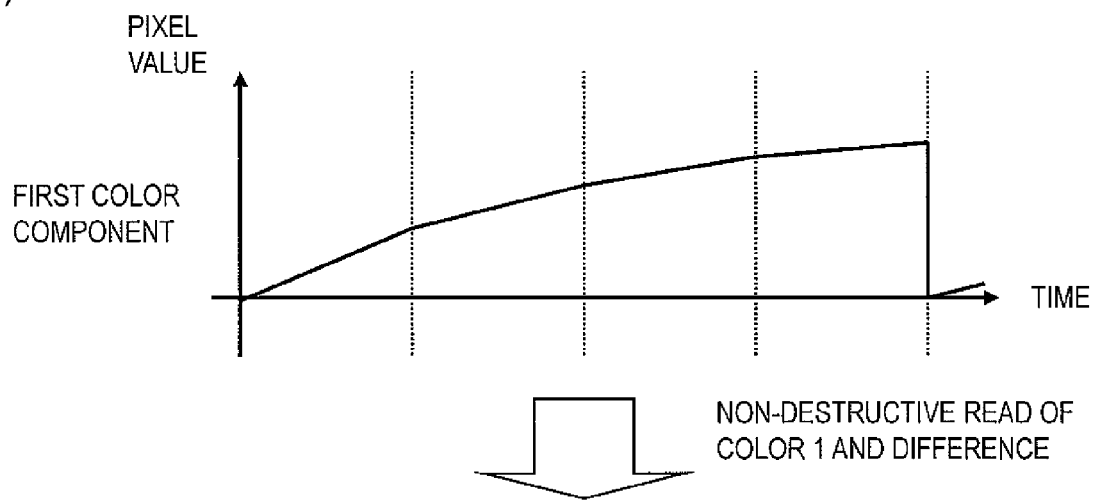
NON-DESTRUCTIVE READ OF
COLOR 1 AND DIFFERENCE
(b)
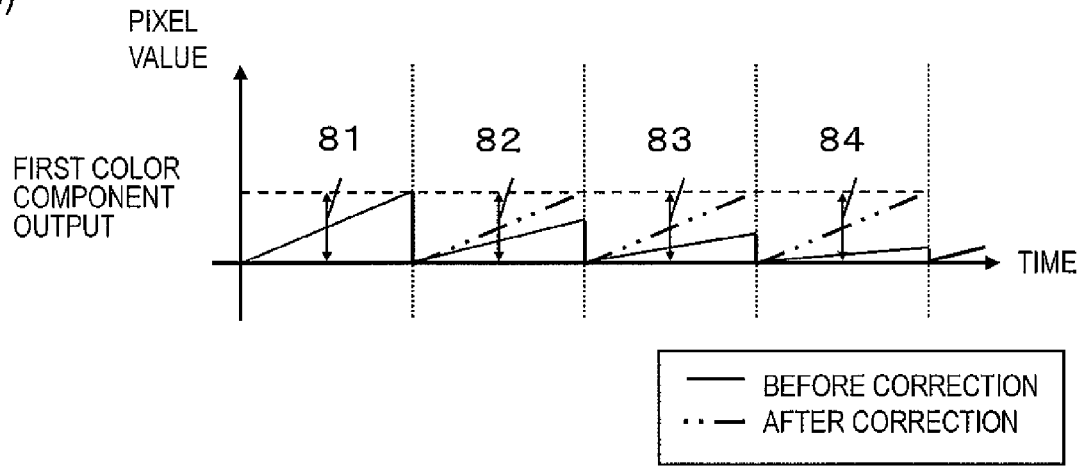
— BEFORE CORRECTION
∙∙— AFTER CORRECTION

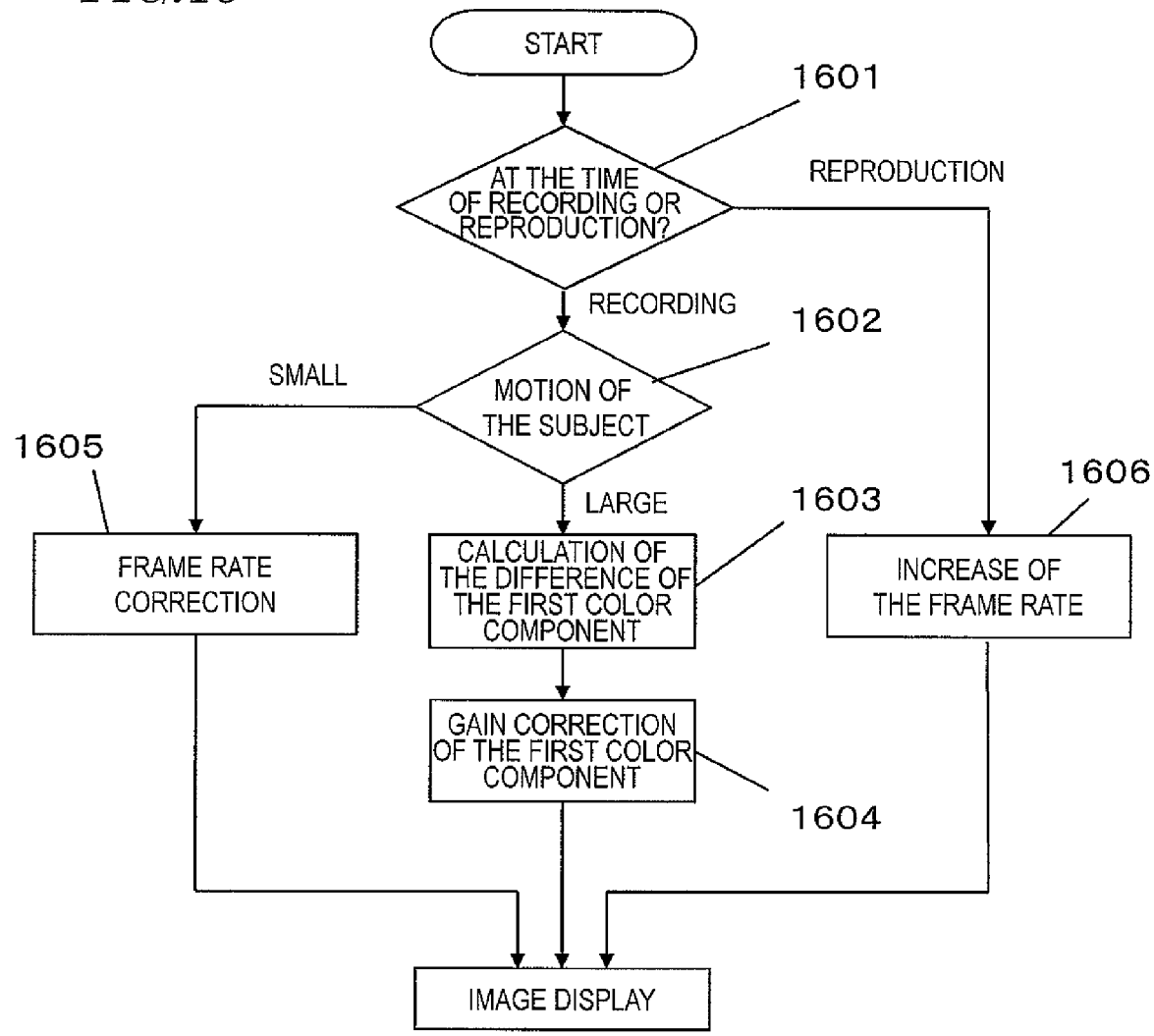

REFERENCE FRAME (IMAGE AT TIME t)

COMPARISON FRAME (IMAGE AT TIME t+1)

IMAGE CAPTURE DEVICE WITH FRAME RATE CORRECTION SECTION AND IMAGE GENERATION METHOD

This is a continuation of International Application No. PCT/JP2011/003077, with an international filing date of Jun. 1, 2011, which claims priority of Japanese Patent Application No. 2010-155897, filed on Jul. 8, 2010, the contents of which are hereby incorporated by reference.

BACKGROUND OF THE INVENTION

1. Field of the Invention

The present invention relates to an image capture device for shooting a color motion picture, and specifically to an image capture device capable of displaying, during image capture, a color motion picture in which a first color component and a second color component are picked up at different charge accumulation time periods.

2. Description of the Related Art

A system of capturing R (red), G (green) and B (blue) color components at different resolutions and different exposure time periods has been proposed. Technologies of separating incident light into, for example, a G component (first color component) and an R and B component (second color component) and picking up these two color components by use of different image sensors are disclosed in WO08/047,664, Japanese Laid-Open. Patent Publication No. 2008-211273, WO2009/019823, and WO2009/019824. When the G color component is picked up at a high resolution and a low frame rate, a necessary charge accumulation time period (exposure time period) and a necessary spatial resolution are obtained for the G color component. Therefore, a G image having a high S/N ratio can be obtained with a sufficient amount of light. By contrast, when the R and B color component is picked up at a low resolution and a high frame rate, an image having a high temporal resolution can be obtained for the R and B color component. By performing image processing on the color component image picked up at a high resolution and a low frame rate and the color component image picked up at a low resolution and a high frame rate, a color motion picture of a high resolution and a high frame rate can be recovered. WO2010/090025 discloses a technique of using a single-plate color image sensor for the above-described system.

When the above-described conventional technology is used for image capture of a moving subject, an image of a color component picked up at a short charge accumulation time period does not include much motion blur of the subject. However, an image of a color component picked up at a long charge accumulation time period includes relatively large motion blur of the subject. When these color component images are merely overlapped to create a color image, a color shift occurs due to the motion blur of the color component picked up at the long charge accumulation time period. When a color image created by merely overlapping color component images of a subject picked up by the above-described image capture system is displayed by an image capture and display device such as a viewfinder or the like, there is a problem that it is difficult to check the state of the subject due to the color shift. Regarding synthesis of a color image in which different color components are picked up at different charge accumulation time periods, a technology described in Japanese Laid-Open Patent Publication No. 2008-211273 is known. According to this technology, color component images picked up at a short charge accumulation time period are added each time when being read while a color component image picked up at a long charge accumulation time period is accumulated, and are output to a display device at the same timing as the color component image picked up at the long charge accumulation time period.

According to above-described conventional structure, an output of a color component picked up at a short charge accumulation time period is adapted to an output of a color component picked up at a long charge accumulation time period. As a result, the frame rate of the output color image is matched to the frame rate of the color component image picked up at the long charge accumulation time period. In this case, when the motion of the subject is large, there occurs a problem that the motion blur of the subject is conspicuous on the display device.

Meanwhile, for obtaining a high frame-rate color image with little motion blur of the subject, it is conceived to perform image processing for increasing the frame rate of the color motion picture to a high level and display the resultant color image on the display section. However, when a display image to be used for checking the subject during image capture is to be created, the image of the subject needs to be displayed in real time. For realizing this, a color image which has been processed to be increased in the frame rate needs to be displayed by the display device. This causes a problem that the display is delayed by the time required for the image processing.

The present invention has an object of providing an image capture device capable of displaying, during image capture, a color image picked up by an image capture system of picking up images of different color components at different charge accumulation time periods.

SUMMARY OF THE INVENTION

An image capture device according to the present invention includes an image capture section for reading a pixel signal of a first color component at a first frame rate and reading a pixel signal of a second color component other than the first color component at a second frame rate which is higher than the first frame rate, wherein the image capture section performs non-destructive read of the pixel signal of the first color component in synchronization with the timing at which the pixel signal of the second color component is read during a charge accumulation time period defined by the first frame rate; a recording medium for recording the pixel signal of the first color component obtained by the read at the first frame rate and the pixel signal of the second color component obtained by the read at the second frame rate; a display section; and a frame rate correction section capable of displaying a color image on the display section at the time of image capture at the second frame rate by use of the pixel signal of the first color component obtained by the non-destructive read and the pixel signal of the second color component obtained by the read at the second frame rate.

In an embodiment, the image capture section includes an image sensor for reading the pixel signal of the first color component and the pixel signal of the second color component, wherein the image sensor is capable of performing non-destructive read of a pixel signal; and an image capture control section for controlling the image sensor to read the pixel signal of the first color component at the first frame rate and to read the pixel signal of the second color component at the second frame rate which is higher than the first frame rate, wherein the image capture control section controls the image sensor to perform non-destructive read of the pixel signal of the first color component in synchronization with the timing at which the pixel signal of the second color component is read during the charge accumulation time period defined by the first frame rate.

In an embodiment, the frame rate correction section includes a memory for recording the pixel signal obtained by the non-destructive read; and a subtraction section for subtracting a pixel signal obtained by immediately previous non-destructive read from a pixel signal obtained by non-destructive read immediately subsequent thereto based on the pixel signals recorded on the memory to find a difference value and outputting the difference value at the second frame rate.

In an embodiment, the frame rate correction section includes a gain correction section for correcting the difference value in accordance with a saturation characteristic between time elapsed from start of the charge accumulation time period in the image sensor and a signal output from the image sensor.

In an embodiment, the gain correction section has a gain adjusting function of correcting so that the output from the subtraction section does not decrease in accordance with the elapse of time from the start of the charge accumulation time period, wherein the gain correction section performs the correction in synchronization with the timing at which the pixel signal of the second color component is read.

In an embodiment, the gain correction section includes a correction coefficient table having two indices of time elapsed from the start of the charge accumulation time period of the pixel signal of the first color component and an amount of incident light; a correction coefficient selection section for selecting a gain correction coefficient from the gain correction coefficient table based on the elapsed time and the amount of incident light; and a multiplication section for multiplying the gain correction coefficient by the pixel signal of the first color component obtained by the non-destructive read. The gain correction section performs the correction so as to maintain a signal strength balance of the color components of the color image in accordance with the elapsed time and the amount of incident light.

In an embodiment, the gain correction section includes an image capture signal table in the case where the amount of light incident on the image capture device does not change; and a comparison section for comparing the output from the subtraction section and a value in the image signal table. The gain correction section detects a difference between the output from the subtraction section and the value in the image signal table at the non-destructive read of the pixel signal of the first color component to select the gain correction coefficient such that the balance among the color components is maintained even when the amount of incident light changes during the charge accumulation.

In an embodiment, the gain correction section includes a function table to which an output pixel signal of the first color component is input; and the gain correction section is capable of calculating an image capture signal in the case where neither gain correction coefficient nor the amount of incident light changes at the time of the non-destructive read of the pixel signal of the first color component, based on the function kept in the function table.

In an embodiment, the frame rate correction section includes a correction selection section for selecting whether or not to perform an operation of the gain correction in accordance with the length of the charge accumulation time period of the pixel signal of the first color component.

In an embodiment, the first color component is green and the second color component is red and blue.

In an embodiment, the image capture section includes a light separation element for separating the incident light into light of the first color component and light of the second color component; a first solid-state image sensor for receiving the light of the first color component; and a second solid-state image sensor for receiving the light of the second color component.

In an embodiment, the image capture section includes a solid-state image sensor in which a plurality of pixels for receiving light of the first color component and a plurality of pixels for receiving light of the second color component are arrayed in one image capture plane.

In an embodiment, the image capture device further includes a second frame rate correction section for performing addition of the pixel signal of the second color component in units of frames, so as to adapt the frame rate of the pixel signal of the second color component to the frame rate of the pixel signal of the first color component; and a correction method selection section for selecting one of the two frame rate correction sections in accordance with a magnitude of a motion of a subject.

In an embodiment, the image capture device further includes an image recovery section for performing spatio-temporal separation of an image of the pixel signal of the first color component based on motion information on the pixel signal of the second color component; and a display method selection section for selecting whether to generate a color motion picture to be displayed on the display section by the frame rate correction section or by the image recovery section in accordance with whether a user selects a recording function or a reproduction function.

An image generation method according to the present invention includes a step A of capturing an image by reading a pixel signal of a first color component at a first frame rate and reading a pixel signal of a second color component other than the first color component at a second frame rate which is higher than the first frame rate; a step B of performing non-destructive read of the pixel signal of the first color component in synchronization with the timing at which the pixel signal of the second color component is read during a charge accumulation time period defined by the first frame rate; a step C of recording, on a recording medium, the pixel signal of the first color component obtained by the read at the first frame rate and the pixel signal of the second color component obtained by the read at the second frame rate; and a step D of displaying a color image on a display section at the time of image capture at the second frame rate by use of the pixel signal of the first color component obtained by the non-destructive read and the pixel signal of the second color component obtained by the read at the second frame rate.

In an embodiment, the step D includes a step of subtracting a signal obtained by immediately previous non-destructive read from a signal obtained by non-destructive read immediately subsequent thereto to find a difference value and outputting the difference value at the second frame rate.

In an embodiment, the step D includes a gain correction step of correcting the difference value in accordance with a saturation characteristic between time elapsed from start of the charge accumulation time period and a signal output from an image sensor.

Another image generation method according to the present invention includes a step A of capturing an image by reading a pixel signal of a first color component at a first frame rate and reading a pixel signal of a second color component other than the first color component at a second frame rate which is higher than the first frame rate; a step B of performing non-destructive read of the pixel signal of the first color component in synchronization with the timing at which the pixel signal of the second color component is read during a charge accumulation time period defined by the first frame rate; a step C of recording, on a recording medium, the pixel signal of the first color component obtained by the read at the first frame rate and the pixel signal of the second color component obtained by the read at the second frame rate; a step D of selecting whether to display a color image on a display section at the time of image capture at the second frame rate by use of the pixel signal of the first color component obtained by the non-destructive read and the pixel signal of the second color component obtained by the read at the second frame rate or to display an image on the display section by use of the pixel signal of the first color component obtained by the read at the first frame rate; and a step E of displaying an image on the display section by use of the selected signal or signals.

A computer program according to the present invention has a processor, included in an image processing device, generate data of a motion picture. The computer program has the processor execute the steps of receiving a pixel signal of a first color component obtained by non-destructive read and a pixel signal of a second color component obtained by read at a second frame rate from the image capture device of any one of claims 1 through 14; and subtracting a pixel signal obtained by immediately previous non-destructive read from a pixel signal obtained by non-destructive read immediately subsequent thereto to find a difference value and outputting the difference value at the second frame rate.

In an embodiment, the computer program further has the processor execute the step of correcting the difference value in accordance with a saturation characteristic between time elapsed from start of a charge accumulation time period and a signal output from an image sensor.

A non-transitory medium according to the present invention stores any one of the above-described computer programs thereon.

According to an image capture device of the present invention, even when a motion of a subject is large, a color motion picture obtained from a first color component and a second color component picked up at different charge accumulation time periods can be displayed with suppressed motion blur on a display section during image capture.

Other features, elements, processes, steps, characteristics and advantages of the present invention will become more apparent from the following detailed description of preferred embodiments of the present invention with reference to the attached drawings.

BRIEF DESCRIPTION OF THE DRAWINGS

FIG. 2 is a block diagram showing a structure of an image capture device in Embodiment 1 according to the present invention.

FIG. 3A is a block diagram showing a structure example of an image capture section in Embodiment 1.

FIG. 3D shows an example of manner of locating image sensor usable in an embodiment according to the present invention.

FIG. 5 provides views of conception regarding an operation of a frame rate correction section according to the present invention.

FIG. 7 provides views of conception regarding charge accumulation of color components picked up at a long charge exposure time period.

FIG. 8 provides views of conception regarding an operation of a gain correction section in the frame rate correction section according to the present invention.

FIG. 16 is a flowchart of an image display method in Embodiment 5 according to the present invention.

DETAILED DESCRIPTION OF PREFERRED EMBODIMENTS

Hereinafter, embodiments of an image capture device according to the present invention will be described with reference to the drawings.

Embodiment 1

Figure 1:
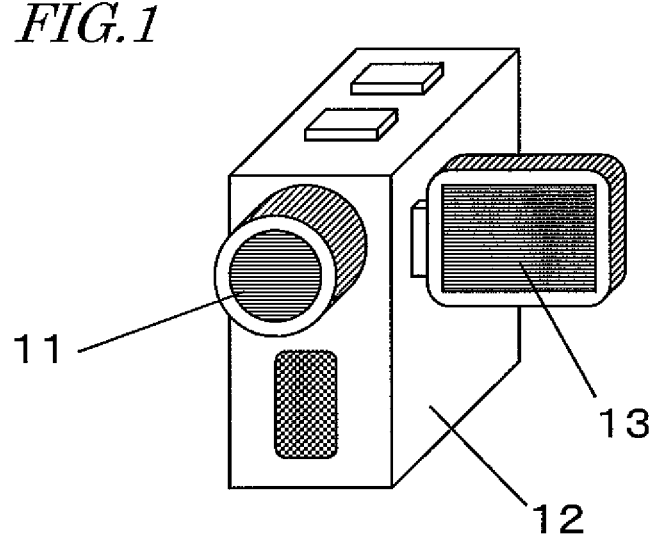
FIG. 1 is a conceptual view of an image capture device and an image capture and display device to which the present invention pertains.

FIG. 1 is an isometric view showing an external appearance of an image capture device in this embodiment. The image capture device shown in FIG. 1 is a video camera (camcorder) including a main body 12, a lens 11 for forming an image of a subject on an image sensor (not shown) located inside the main body 12, and a viewfinder 13. The viewfinder 13 is an image display section and displays the subject at the time of image shooting. The viewfinder 13 can also reproduce and display a picked up image (recorded image) after the shooting.

FIG. 2 is a block diagram showing a structure of the image capture device in this embodiment. As shown in FIG. 2, the image capture device in this embodiment includes an image capture section 20, a frame rate correction section 22, a display section 21, a recording section 23, a main control section 24 for controlling each of sections in the image capture device, and an input section 25 for transmitting an instruction from a user to the main control section.

In this embodiment, the image capture section 20 includes a first color component read section 20a for reading a pixel signal of a first color component at a first frame rate and a second color component read section 20b which can read a pixel signal of a second color component other than the first color component at a second frame rate which is higher than the first frame rate. In this embodiment, the first color component is green (G), and the second color component is red (R) and blue (B). It is optional which color is the first color component or the second color component. The image capture section 20 can perform "non-destructive read" of a pixel signal of the first color component in synchronization with the timing at which a pixel signal of the second color component is read during a charge accumulation time period defined by the first frame rate. The "non-destructive read" will be described in detail later.

As shown in FIG. 2, in this embodiment, a first color component image which is output from the first color component read section 20a of the image capture section 20 is input to the frame rate correction section 22 and the recording section 23 in parallel. In the meantime, a second color component image which is output from the second color component read section 20b of the image capture section 20 is input to the display section 21 and the recording section 23 in parallel. Namely, the first color component image which is output from the first color component read section 20a is not directly input to the display section 21 but is first input to the frame rate correction section 22 and then to the display section 21.

The frame rate correction section 22 performs frame rate correction on the first color component image obtained by the first color component read section 20a. Then, the frame rate correction section 22 outputs a color image having a frame rate adapted to the frame rate of the second color component image obtained by the second color component read section 20b, and supplies the color image to the display section 21.

In this specification, the frame rate at which an image is read from the image capture section is occasionally referred to as the "image capture frame rate", and the frame rate at which the image is displayed on the display section is occasionally referred to as the "display frame rate". The "image capture frame rate" is defined as the "number of times, per second, of read accompanying reset of a pixel signal (destructive read)". The term "image capture frame rate" is used with the usual meaning of the term "frame rate" of a general image sensor. In this embodiment, the "image capture frame rate" of the first color component image does not match the "display frame rate". More specifically, the "display frame rate" of the first color component image is higher than the "image capture frame rate" thereof. For example, the "display frame rate" of the first color component image is four times the "image capture frame rate" thereof. By contrast, in this embodiment, the "display frame rate" of the second color component image matches the "image capture frame rate" thereof.

In the case where the image capture frame rate is different from the display frame rate, an image to be displayed is generated from an image obtained by image capture. In this specification, such generation of an image to be displayed is referred to as the "frame rate correction". In this embodiment, the "frame rate correction" is performed on the first color component image, but is not performed on the second color component image. The frame rate correction is performed by the frame rate correction section 22.

The display section 21 can display a color image obtained as a result of processing performed by the frame rate correction section 22 in real time at the time of image shooting. The recording section 23 writes (records) each of the color component images obtained by the first and second color component read sections.

The main control section 24 can set conditions of image shooting (frame rate, exposure time, zoom magnification, etc.) performed by the image capture section 20 based on an instruction from a user received from the input section 25.

In the above-described structure, the image capture section 20, the frame rate correction section 22, the recording section 23, the main control section 24 and the input section 25 are located in the main body 12 shown in FIG. 1, and the display section 21 is located in the viewfinder 13. The recording section 23 may be formed of a recording medium detachable from the main body 12.

In the structure example shown in FIG. 2, the frame rate correction section 22 includes a storage section 221, a subtraction section 222, a correction control section 223, and a gain correction section 224. The storage section 221 stores a pixel signal, obtained by non-destructive read at a time defined by an image capture control section 202, of the first color component image picked up by the first color component read section 20a. The subtraction section 222 finds a difference between a pixel signal obtained by immediately previous non-destructive read and stored in the storage section 221 and a pixel signal obtained by the current non-destructive read. The correction control section 223 controls write of a pixel signal to the storage section 221 and read of data stored in the storage section 221 by the subtraction section 222. The gain correction section 224 adjusts a gain of an output from the subtraction section 222. The frame rate correction section 22 will be described in more detail later.

Now, structure examples of the image capture section 20 will be described.

First, FIG. 3A will be referred to. The image capture section 20 shown in FIG. 3A includes an image sensor 201 having a photoelectric conversion function of converting the intensity of incident light of each of color components of Rch (channel), Gch and Bch into an electrical signal, and the image capture control section 202 having a function of supplying a read signal and a pixel reset signal to each of color image sensors included in the image sensor 201 independently.

Figure 3B:
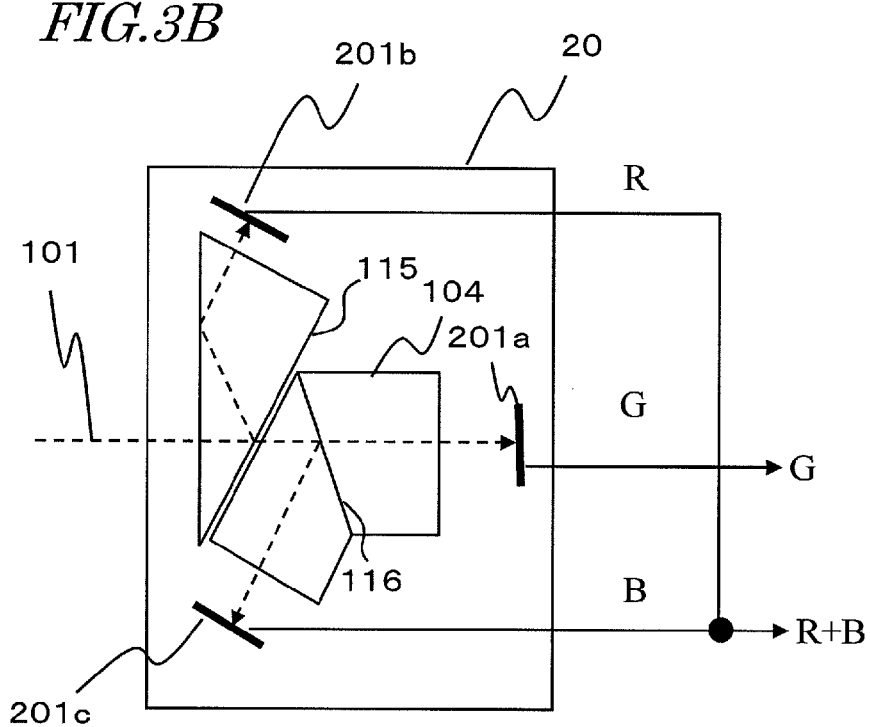
FIG. 3B shows an example of manner of locating image sensors usable in an embodiment according to the present invention.

As shown in, for example, FIG. 3B, the image capture section 20 may include three image sensors 201a, 201b and 201c. In the example of FIG. 3B, the image capture section 20 includes a color separation section 104 for separating incident light 101 into a wavelength of R light, a wavelength of G light and a wavelength of B light. The image sensor 201a acquires a G image, the image sensor 201b acquires an R image, and the image sensor 201c acquires a B image. A face 115 of the color separation section 104 reflects the R light having a relatively long wavelength and transmits light of the other wavelengths. A face 116 of the color separation section 104 reflects the B light having a relatively short wavelength and transmits light of the other wavelengths. A system of acquiring a color image by use of three image sensors in this manner is referred to as the "3-plate system". The structure of the image capture section 20 is not limited to the structure of the 3-plate system shown in FIG. 3B, and may be a structure shown in FIG. 3C or FIG. 3D.

Figure 3C:
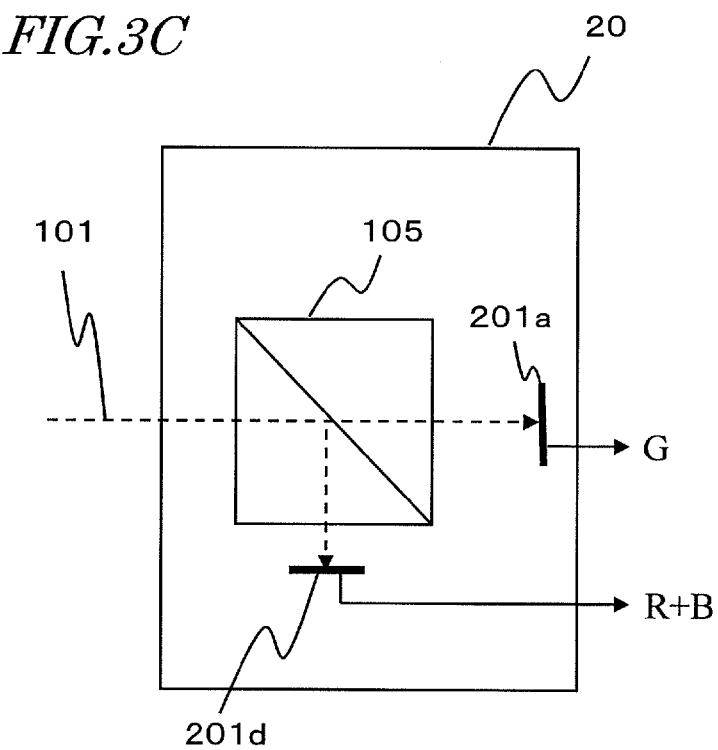
FIG. 3C shows an example of manner of locating image sensors usable in an embodiment according to the present invention.

In the example shown in FIG. 3C, the image capture section 20 includes a color separation section 105 for separating the incident light 101 into G light (first color component) and R and B light (second color component). In this example, the image sensor 201*a* acquires a G image, and an image sensor 201*d* acquires an R image and a B image.

In the example shown in FIG. 3D, one image sensor 201*e* of the image capture section 20 acquires a G image, an R image and a B image (single-plate system). In order to change the frame rate (image capture frame rate) at which an image is read for each color component by means of one image sensor 201*e*, a CMOS image sensor needs to be used as the image sensor 201 instead of a CCD. In the case of the 3-plate system, CCDs may be used.

Figure 3E:
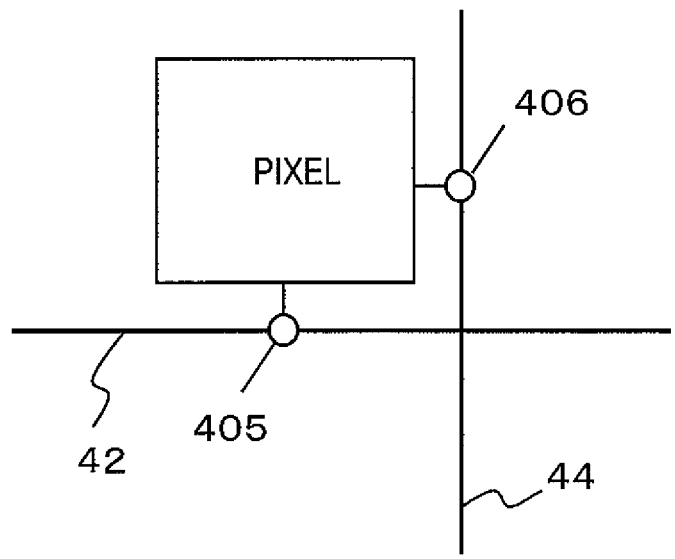
FIG. 3E shows the relationship among a pixel, a read signal line, and an output signal line.

Now, with reference to FIG. 3E and FIG. 3F, structure examples of a pixel formed on an image capture plane of the image sensor 201 will be described. FIG. 3E schematically shows one of a plurality of pixels as well as a read signal line 42 and an output signal line 44 connected to the pixel. A read signal on the read signal line 42 is supplied to the pixel via an input terminal 405. A pixel signal which is output from the pixel is supplied to the output signal line 44 via an output terminal 406.

Figure 3F:
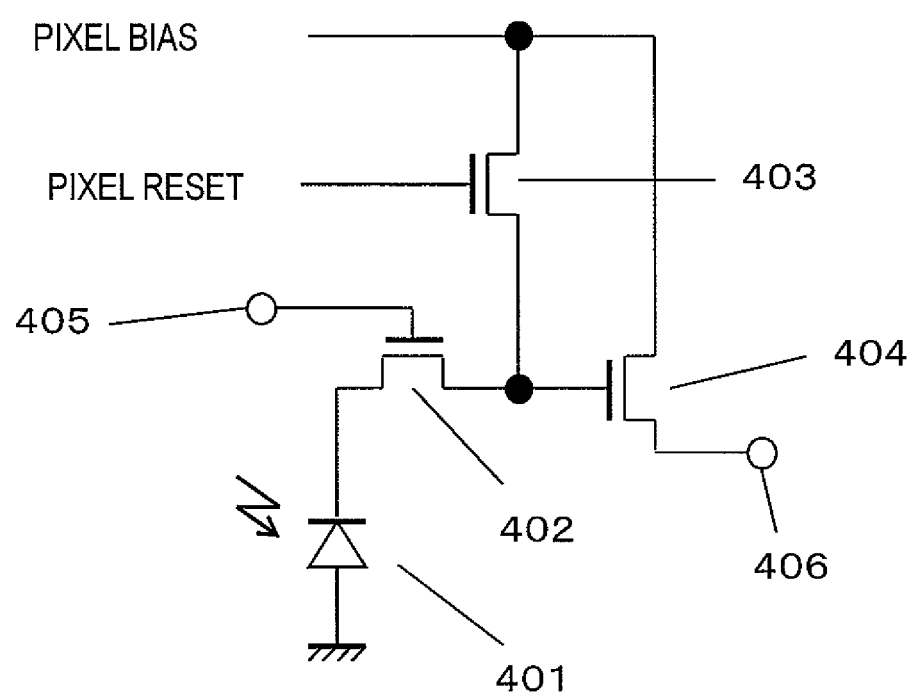
FIG. 3F is a circuit diagram showing an example of internal structure of the pixel.

FIG. 3F shows an example of circuit structure of each pixel. On the image capture plane of the image sensor 201, a great number of pixels are arrayed in rows and columns, and each of the pixels basically has a structure shown in FIG. 3F.

As shown in FIG. 3F, each pixel includes a photodiode 401 for generating a charge corresponding to the amount of incident light by photoelectric conversion and accumulating such charges. To the photodiode 401, a switch 402 is connected. The switch 402 is turned ON or OFF in response to a signal received by the input terminal 405. When the switch 402 is switched from an OFF state to an ON state, a potential corresponding to the amount of charges accumulated in the photodiode 401 is supplied to a gate of an analog buffer 404. As a result, the analog buffer 404 can output a signal corresponding to the amount of charges accumulated in the photodiode 401 to the output terminal 406 as a "pixel signal".

A switch 403 and a drain of the analog buffer 404 have a pixel bias supplied thereto. When the switch 403 is put into an ON state, the gate of the analog buffer 404 is supplied with a pixel bias and the pixel signal is reset.

A read signal is a signal which is supplied to the input terminal 405 via the read signal line 42 shown in FIG. 3E to put the switch 402 into an ON state from an OFF state. A pixel signal is a signal which is output from the output terminal 406 to the output signal line 44 in response to the read signal being input. Namely, a pixel signal represents the amount of charges accumulated in the photodiode 401 at the timing at which a read signal is supplied. Usually, after a read signal is supplied to the input terminal 405 and a pixel signal is output from the output terminal, the pixel is reset. As a result, the amount of charges accumulated in the photodiode 401 is reset.

In this specification, the "non-destructive read" means read by which, after a pixel signal is read from the output terminal 406, the charges are kept accumulated in the photodiode 401 without resetting the pixel. When the "non-destructive read" is performed, the amount of charges accumulated in the photodiode 401 is not reset.

Returning to FIG. 3A, the image capture control section 202 sets (i) a first image capture condition under which image capture is performed at a long charge accumulation time and a low frame rate and (ii) a second image capture condition under which image capture is performed at a short charge accumulation time and a high frame rate. These conditions are set independently for each of an R component, a G component and a B component corresponding to the color component image sensors included in the image sensor 201, based on the timing at which a read signal and a pixel reset signal are supplied.

FIG. 3A shows a structure example of the image capture section 20, in which the G component is set to the first color component and the R and B components are set to the second color component. The first color component and the second color component are not limited to the above example.

In the example shown in FIG. 3A, images of the R component, the G component and the B component are respectively acquired by the three image sensors 201. The image capture section 20 having such a structure is realized by including the color separation section 104 for separating the incident light into three color components, i.e., the R component, the G component and the B component as shown in FIG. 3B. In this case, no color filter is needed on the image planes of the image sensors 201*a*, 201*b* and 201*c* shown in FIG. 3B. However, in the case where one image sensor 201*d* performs image capture of the R and B components as shown in FIG. 3C, the image sensor 201*d* is provided with a color filter array including a color filter for transmitting R (R filter) and a color filter for transmitting B (B filter). In the case where one image sensor 201*e* performs image capture of the G, R and B components as shown in FIG. 3D, the image sensor 201*e* is provided with a color filter array including a color filter for transmitting G (G filter), an R filter and a B filter.

The first color component image is picked up under image capture conditions of a long exposure time period and a low frame rate. In this embodiment, the "low frame rate" is roughly ⅓ or ¼ to 1/20 of the image capture frame rate used for the second color component. In this embodiment, the "long charge accumulation time period" is, at the longest, a time period of one frame which is determined by the value of the image capture frame rate and is longer than the "short charge accumulation time period".

The second color component image is picked up under image capture conditions of a short exposure time period and a high frame rate. In this embodiment, the "high frame rate" is in the range of, for example, about 30 fps (frame per second) to 60 fps. In this embodiment, the "short charge accumulation time period" is, at the longest, a time period of one frame which is determined by the frame rate (in this embodiment, about 1/30 sec. to 1/60 sec.).

The expressions "short charge accumulation time period", "long charge accumulation time period", "high frame rate" and "low frame rate" represent relative values. Namely, the charge accumulation time period of the first color component of a color image merely needs to be longer than the charge accumulation time period of the second color component, and the frame rate of the first color component merely needs to be lower than that of the second color component. The values are not limited to the above-mentioned ranges.

In this embodiment, the frame rate (image capture frame rate) at which the image is read is varied for each color component. For example, as by the technology described in WO08/047,664, the image capture frame rate and also the density of pixels at the time of image capture can be varied for each color component. The frame rate of the first color component is lower than that of the second component. Therefore, in a typical example, the number of pixels of the first color component is set to be higher than that of the second color component. In this case, in order to synthesize the images of the first color component and the second color component to display a color image on the display section 23, it is preferable that the numbers of pixels, which are different among the color components, are matched to each other.

For displaying a color image on the display section 23 at the time of image capture, a high spatial resolution is not required. Therefore, the number of pixels of an image of a color component formed of a large number of pixels, i.e., the number of pixels forming a first color component in this example, can be reduced. In a typical example of the 3-plate system shown in FIG. 3B, the number of pixels of the image sensor 201*a* for a color component of a high spatial resolution (first color component) is larger than that of the image sensor 201*b*, 201*c* or 201*d* for a color component of a low spatial resolution (second color component). In this case, the number of pixels forming the first color component image can be easily reduced by summing up outputs from a plurality of nearby pixels in the image sensor 201*a* for the first color component. In the meantime, in the case of a single-plate system shown in FIG. 3D, one known technique for performing image capture with a different number of pixels for each color component is to, as disclosed in WO2010/090025, spatially add pixels adjoining the pixel of interest of the second color component (binning). Alternatively in such a case, the number of pixels of the image of a color component of a low spatial resolution (second color component) can be matched to the number of pixels of the image of a color component of a high spatial resolution (first color component) by performing pixel interpolation on the second color component image and thus raising the spatial resolution thereof. Still alternatively, all the color component images which are input to the display section 21 can be caused to have an equal number of pixels by a structure in which the binning operation is conducted outside the image capture section 20 and a pre-binning second color component image can be input to the display section 21. The display section 21 is for temporarily displaying the state of the subject at the time of image capture, and therefore an image input thereto does not necessarily need to have a high S/N ratio. Accordingly, there is no practical problem even when the binning on the second color component image is omitted and thus an image having an S/N ratio which is not sufficiently improved is input to the display section 21 as described above.

Figure 3G:
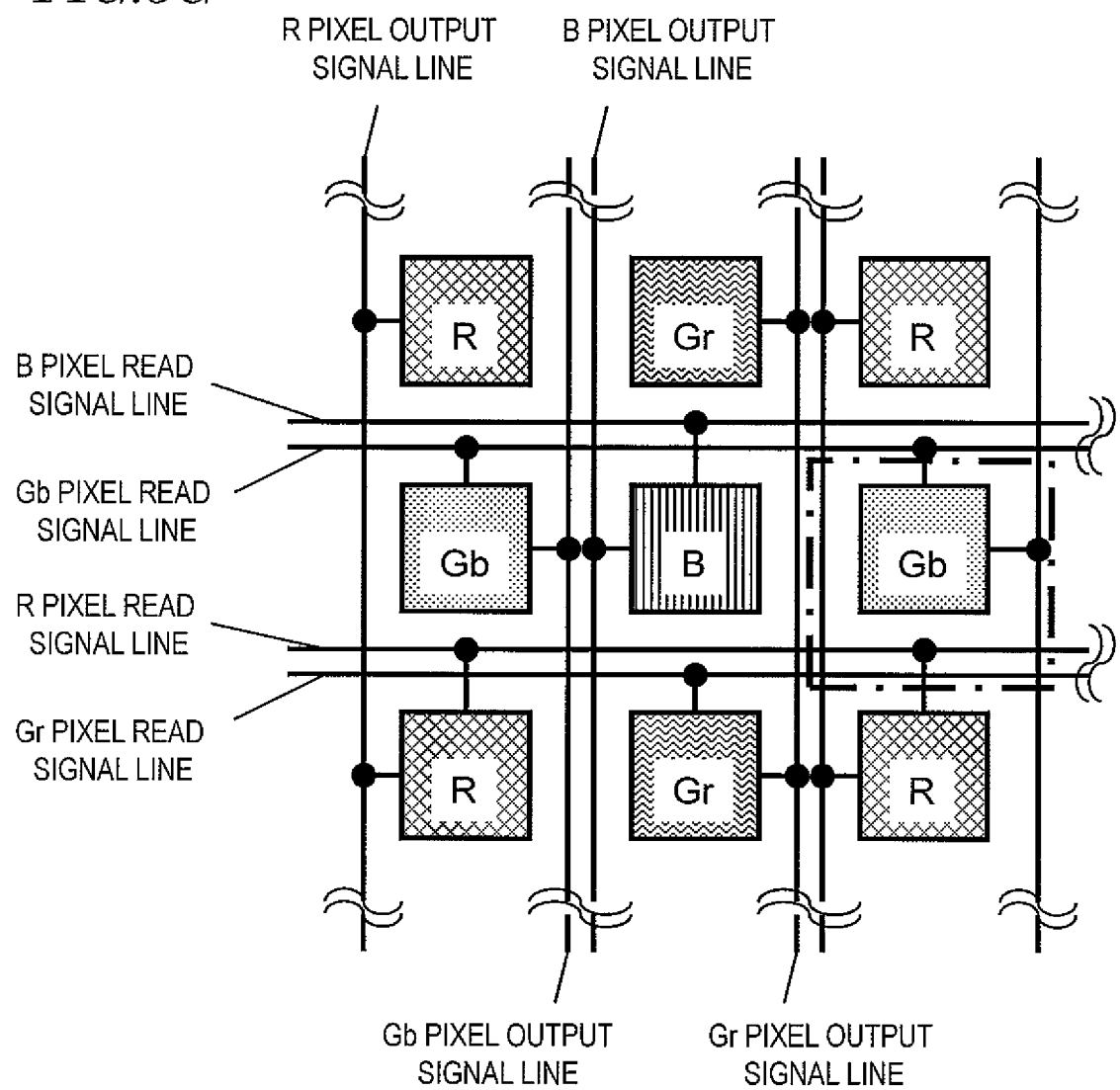
FIG. 3G shows a structure example of an image capture plane of an image sensor of a single-plate system.

FIG. 3G shows a structure of a single-plate image sensor described in "A 2.2/3-inch 4K2K CMOS Image Sensor Based on Dual Resolution And Exposure Technique", by Takeo Azuma, Taro Imagawa, Sanzo Ugawa, Yusuke Okada, Hiroyoshi Komobuchi, Motonori Ishii, Shigetaka Kasuga, Yoshihisa Kato, Proceedings in IEEE International Solid-State Circuit Conference 2010, pp. 408-410, 2010 (Hereinafter, Non-Patent Document 1). In FIG. 3G, reference sign R represents a pixel used for detecting the intensity of an R component of incident light, reference sign B represents a pixel used for detecting the intensity of a B component of the incident light, and reference signs Gr and Gb each represent a pixel used for detecting the intensity of a G component of the incident light. In this image sensor, rows in which R pixels and G pixels are located alternately in a horizontal direction (RG rows) and rows in which B pixels and the G pixels are located alternately in the horizontal direction (BG rows) are located alternately in a vertical direction.

Hereinafter, the G pixels in the RG rows will be referred to as the "Gr pixels", and the G pixels in the BG rows will be referred to as the "Gb pixels". In Non-Patent Document 1, it is assumed that the exposure time period of the G pixels is longer than the exposure time period of the R and B pixels, and that the G pixels are output at a lower frame rate than the frame rate of the R and B pixels. As shown in FIG. 3G, read signal lines for transmitting a read signal to each type of pixels and output signal lines for transmitting a pixel output signal to the next-stage processing such as AD conversion or the like are provided separately for the R, B and G pixels. As a result, two signal lines, i.e., a read signal line connected to R pixels or the B pixels and a read signal line connected to the G pixels extend in the horizontal direction along each pixel row. By contrast, two signal lines, i.e., an output signal line connected to the R pixels and the B pixels and an output signal line connected to the G pixels extend in the vertical direction along each pixel column. Owing to such a structure, read signals can be supplied independently to the R, B and G pixels and also outputs can be obtained from the pixels of these colors in parallel (the signals from these pixels can be read). The structure of the image capture plane of a single-plate image sensor is not limited to the example shown in FIG. 3G.

As shown in FIG. 3A, the image capture control section 202 is connected to the main control section 24, and the main control section 24 is connected to the input section 25.

Again, FIG. 2 will be referred to.

The display section 21 synthesizes the first color component image corrected by the frame rate correction section 22 and the second color component image to display a color image.

The recording section 23 records the first color component image picked up at a low frame rate and the second color component image picked up at a high frame rate. The recording section 23 may be included in the display section 21 and record the same image as the image input to the display section 21 (output from the frame rate correction section 22)

The frame rate correction section 22 makes a correction for enabling the first color component image to be output to the display section 21 at the same frame rate (display frame rate) as that of the second color component image.

Hereinafter, the frame rate correction section 22 will be described in detail.

Figure 4:
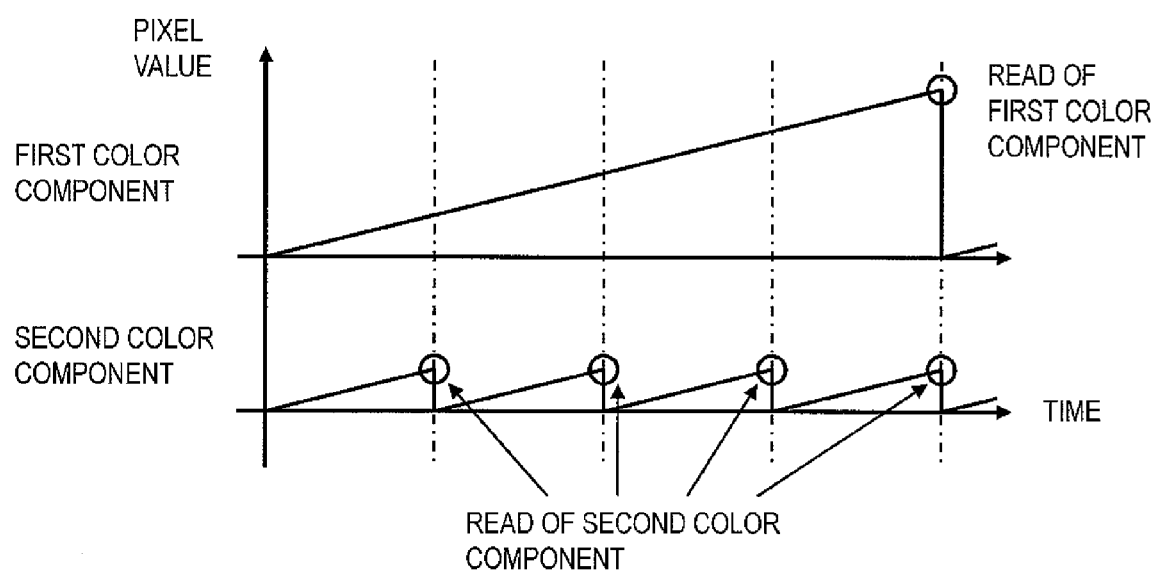
FIG. 4 is a conceptual view showing an image capture system by which the charge accumulation time period is different by color.

FIG. 4 shows the relationship between the amount of accumulated charges and the time in the case where the first color component image and the second color component image are read in accordance with the respective charge accumulation time periods without non-destructive read by the image capture control section 202. As an example, the charge accumulation time period of the first color component image is four times the charge accumulation time period of the second color component image. The charge accumulation time periods are not limited to those in this example, and the charge accumulation time period of the first color component image merely needs to be longer than the charge accumulation time period of the second color component image.

Referring to FIG. 4, read is performed at a time represented by each circle. In the example of FIG. 4, during the time period in which the second color component image is read four times, the pixel outputs of the first color component image are kept accumulated. The image capture frame rate of the first color component image is ¼ of the image capture frame rate of the second color component image. The first color component image is read at the time when the time period corresponding to four frames of the second color component image has elapsed. During one frame of the first color component image, the second color component image is read four times, and the pixel signal is reset at each read. After one frame of the first color component image is finished, the pixel output of the first color component image is reset. In this embodiment, during one frame of the first color component image, non-destructive read is performed.

Hereinafter, an operation of the frame rate correction section 22 will be described in more detail with reference to FIG. 5.

In this embodiment, even while the charges are accumulated for the first color component image, non-destructive read is performed in accordance with the timing at which the second color component image is read. Specifically, at three time points 51, 52 and 53 shown in FIG. 5(a), pixel signals are read in a non-destructive manner while the charges are kept accumulated with no rest of pixel signals.

A pixel signal read at the time point 51 (corresponding to a difference 55 in FIG. 5(a)) is output to the display section 21 as it is and is also stored in the storage section 221. Then, at the read time of the time point 52, the subtraction section 222 finds a difference 56 between the pixel signal at the time point 51 stored in the storage section 221 and a pixel signal read at the time point 52, and outputs the difference 56 to the display section 21. At the same time, the signal read at the time point 52 is stored in the storage section 221.

The above-described operation is performed at the time point 53 and a time point 54. At the time point 53, a difference 57 in FIG. 5(a) is output to the display section 21, and at the time point 54, a difference 58 in FIG. 5(a) is output to the display section 21. In the example of this figure, a pixel signal of the first color component image is reset at the time point 54.

FIG. 5(b) shows the amount of charges of the first color component accumulated during four time periods matching the four charge accumulation time periods of the second color component.

Now, with reference to FIG. 6, an operation of the correction control section 223 of the frame rate correction section 22 will be described.

Figure 6A:
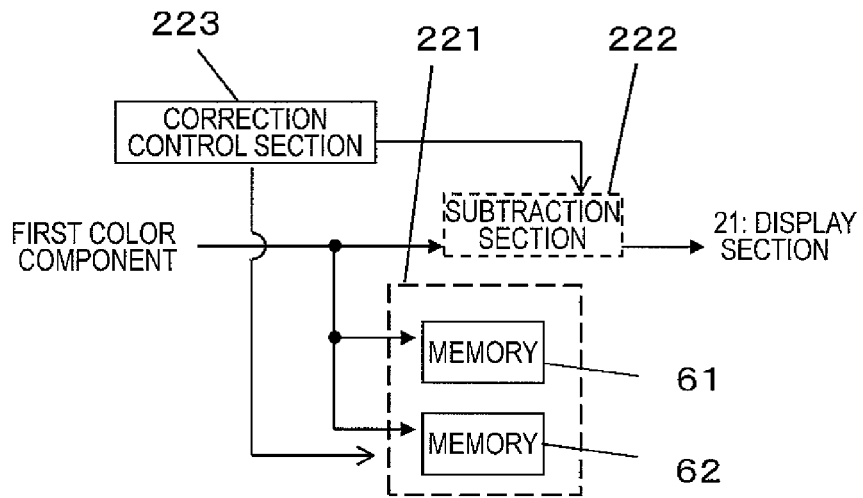
FIGS. 6A, 6B and 6C provide views of conception regarding an operation of a frame rate correction control section according to the present invention.
Figure 6B:
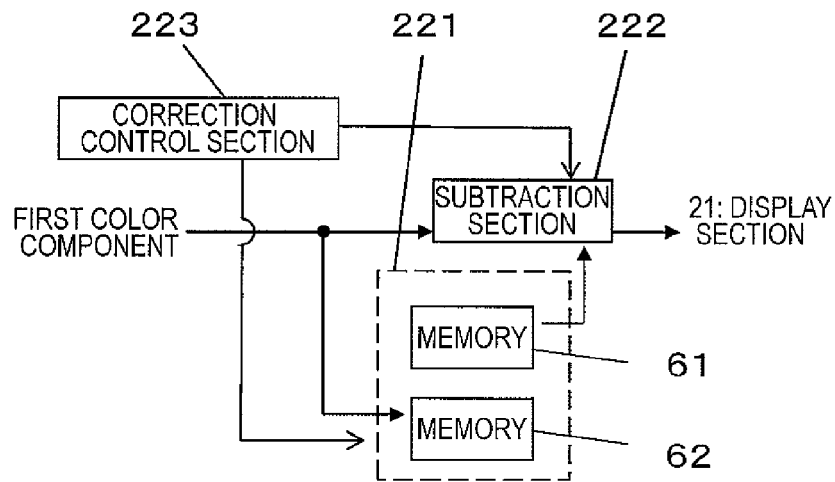
Figure 6C:
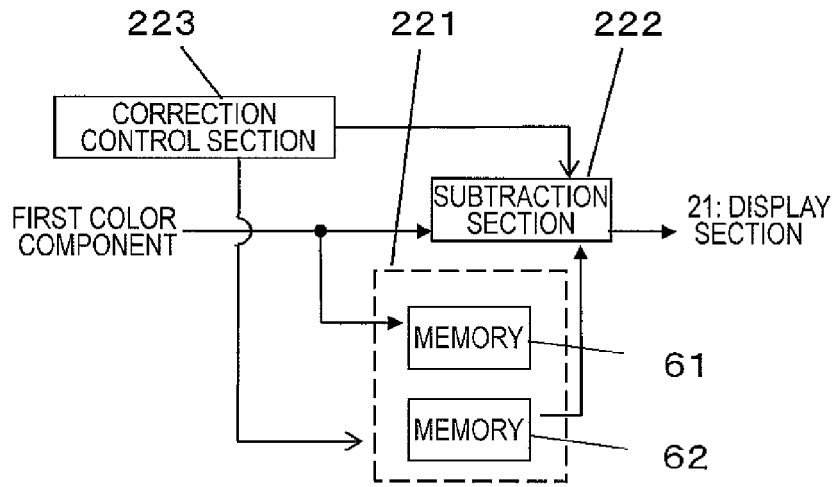

The correction control section 223 controls write of the pixel signal of the first color component, which has been read in the non-destructive manner, to the storage section 221 and read of the pixel signal from the storage section 221, in accordance with the number of times the second color component is read after the start of the charge accumulation of the pixel signal of the first color component. In the example of FIG. 6, the storage section 221 includes two memories 61 and 62. At the first non-destructive read after the start of the charge accumulation of the pixel signal of the first color component (time point 51 in FIG. 5), as shown in FIG. 6A, the pixel signal of the first color component is recorded on both of the memories 61 and 62. The subtraction section 222 is not operated, and the read pixel signal is output to the display section 21 as it is. At the next non-destructive read of the first color component image (time point 52 in FIG. 5), the correction control section 223 operates as shown in FIG. 6B. Data stored on either memory, for example, the memory 61 and the pixel signal obtained by the current non-destructive read are input to the subtraction section 222, and a difference thereof is output to the display section 21. At the same time, the pixel signal obtained by the current non-destructive read is stored on the other memory, for example, the memory 62. At the next non-destructive read of the first color component image (time point 53 in FIG. 5), the correction control section 223 operates as shown in FIG. 6C. The data stored on the memory having the pixel signal obtained by the immediately previous non-destructive read in FIG. 6B, for example, the memory 62 and the pixel signal obtained by the current non-destructive read are input to the subtraction section 222, and a difference thereof is output to the display section 21. At the same time, the pixel signal obtained by the current non-destructive read is stored on the other memory, for example, the memory 61. After this, at each non-destructive read of the first color component image, the operations shown in FIG. 6B and FIG. 6C are repeated. When the pixel signal of the first color component is reset, the operation shown in FIG. 6A is performed.

In FIG. 2 and FIGS. 6A through 6C, the storage section 221 includes two memories. Alternatively, the storage section 221 may include one memory, so that after the read to the subtraction section 222 is finished, a signal obtained by the non-destructive read is written into the memory.

In this embodiment, as shown in FIG. 2, the difference between the pixel signals obtained by the subtraction section 222 is input to gain correction section 224. The gain correction section 224 adjusts the gain of an output from the subtraction section 222, which is input to the display section 21. When the charge accumulation time period of a pixel signal is long and the amount of accumulated charges thereof is long as in the case of the pixel signal of the first color component, the pixel signal is saturated in general as shown in FIG. 7(a). This occurs because, for example, in the image capture section 20, an amplifier for amplifying a pixel signal does not have the same gain for all the inputs; but as the level of the input signal is increased, the gain is decreased. At this point, the output from the subtraction section 222 at the time when the second color component is read is decreased as the time elapses as represented by heights 75 through 78 in FIG. 7(b). Accordingly, by the read at a time point 73 or 74, a difference smaller as compared with the amount of actually accumulated charges is obtained. Therefore, the color image displayed on the display section 21 has an unnatural tint with the amount of the first color component being decreased.

FIG. 8(a) shows the relationship between the pixel signal and the accumulation time period of the first color component when the saturation occurs. FIG. 8(b) shows an effect of the gain correction section 224. When the correction is made such that the above-described difference is multiplied by a gain coefficient which is larger as the elapsed time from the start of the accumulation of charges of the first color component is longer, a signal having a level represented by the two-dot chain line in FIG. 8(b) can be obtained. Heights 81, 82, 83 and 84 shown in FIG. 8(b) represent difference values after the correction. By this correction, the decrease of the output from the subtraction section 223 in accordance with the elapse of time from the start of the read of the first color component image can be avoided.

Now, a structure example of the gain correction section 224 for making the above-described correction will be described.

Figure 9:
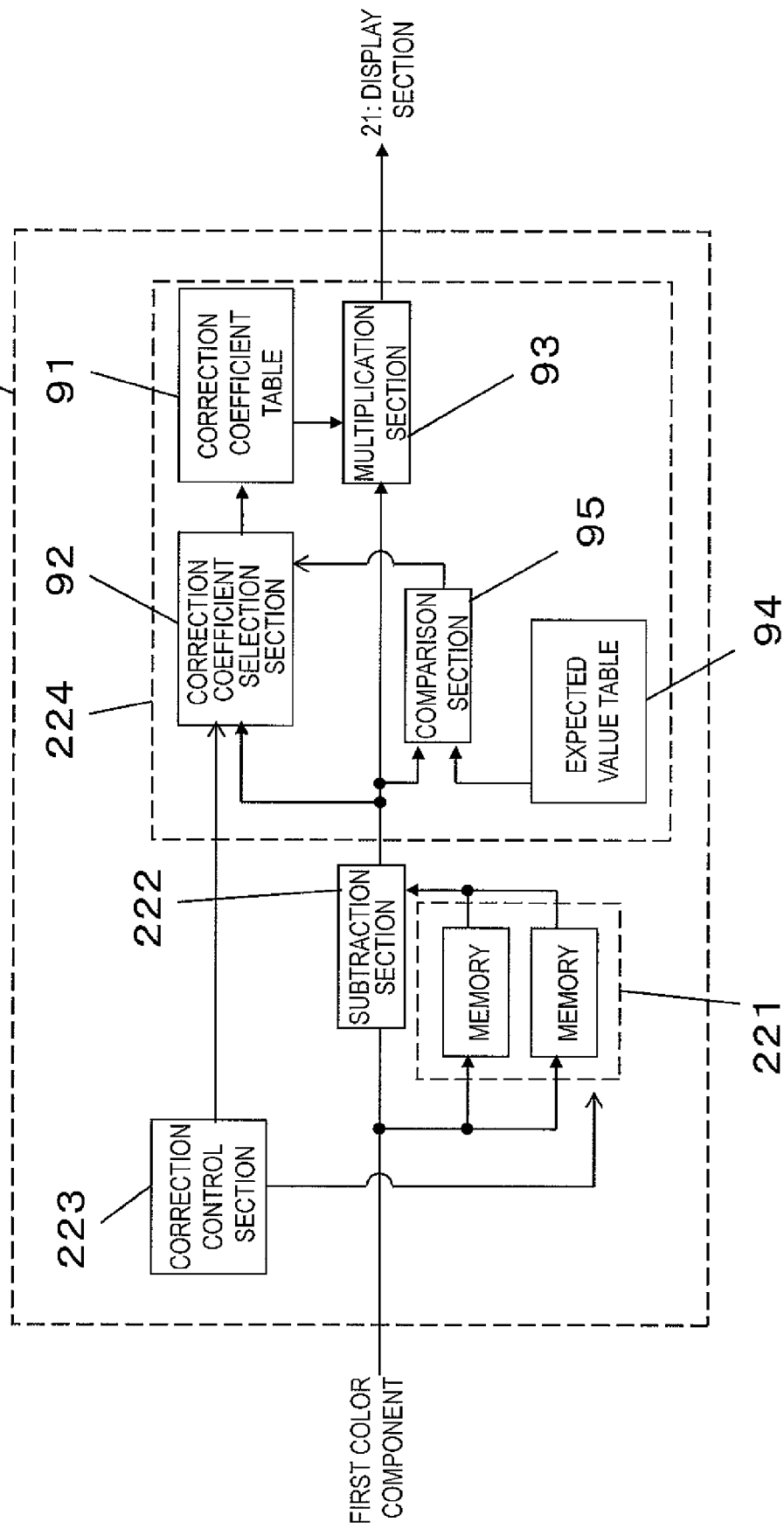
FIG. 9 is a block diagram showing a structure of a frame rate correction section including coefficient and signal tables in Embodiment 1 according to the present invention.

FIG. 9 is a block diagram showing a structure example of the gain correction section 224 included in the frame rate correction section 22. The gain correction section 224 includes a correction coefficient table 91 for keeping coefficients for gain correction, a correction coefficient selection section 92 for selecting an appropriate correction coefficient from the correction coefficient table 91, a multiplication section 93 for performing a multiplication of the output from the subtraction section 222 by a gain correction coefficient, an expected value table 94 for keeping a pixel signal value obtained when the amount of light incident on the image sensor 201 does not change during the charge accumulation time period of the first color component image, and a comparison section 95 for comparing which of the signal value of the expected value table 94 and the output from the subtraction section 222 is of a higher level or a lower level and controlling the correction coefficient selection section 92.

The correction coefficient table 91 has two indices, namely, the elapsed time from the start of the accumulation of charges of the first color component image and the intensity of light incident on the image sensor 201, i.e., the level of the pixel signal of the first color component. The correction coefficient selection section 92 selects an appropriate correction coefficient from the correction coefficient table and outputs the selected correction coefficient to the multiplication section 93. The multiplication section 93 multiplies the gain correction coefficient by the output from the subtraction section 223, and outputs the multiplication result on the display section 21.

Figure 10:
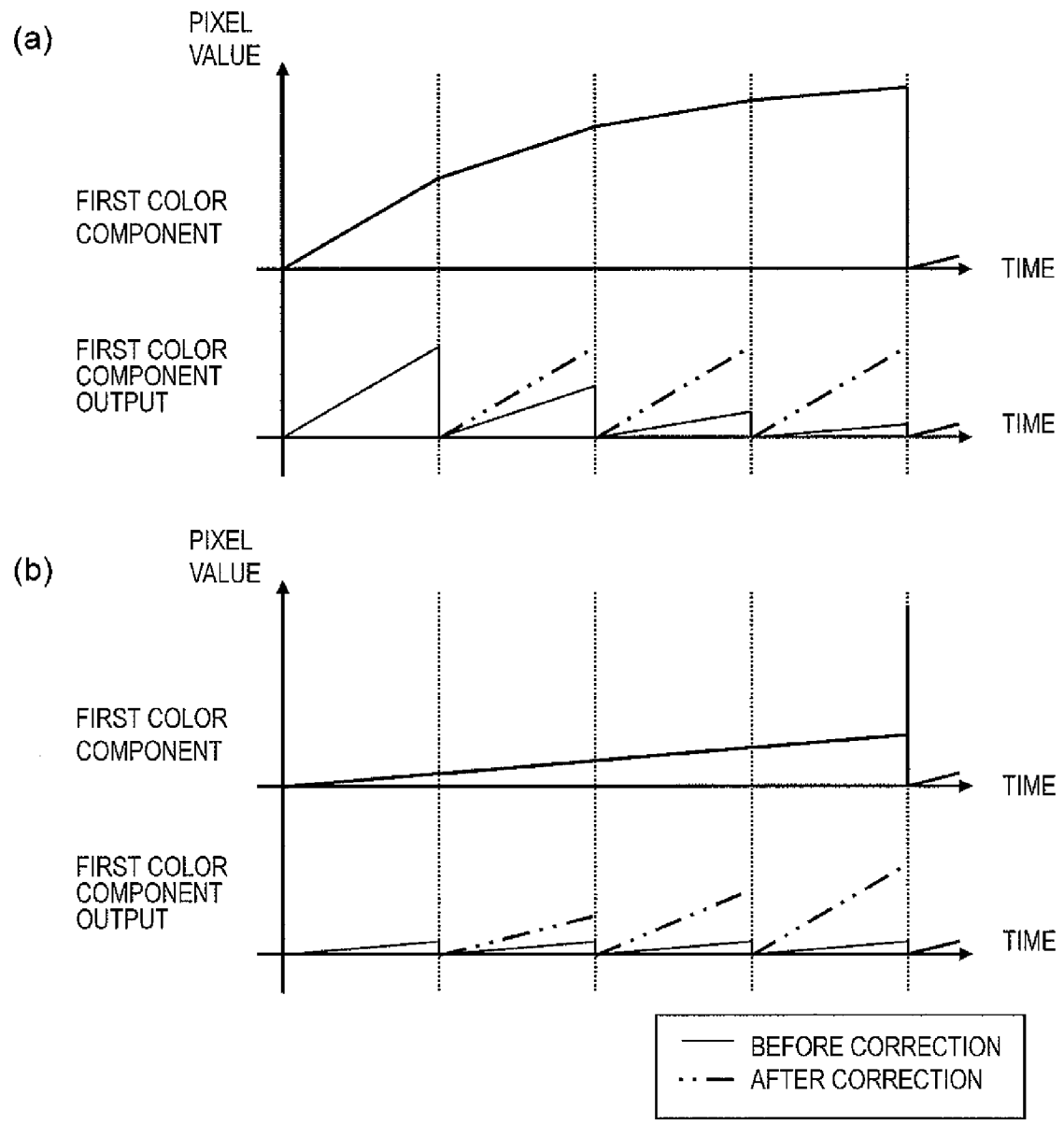
FIG. 10 provides views of conception showing how the change of the charge accumulation state of a color component picked up at a long charge accumulation time period differs by the amount of incident light.

The correction coefficient selection section 92 selects a gain correction coefficient using the correction coefficient table 91 adaptively for the amount of light incident on the image sensor 201, such that when the amount of incident light is larger than a prescribed value, the degree of gain correction is high, and when the amount of the incident light is equal to or smaller than the prescribed value, the degree of gain correction is low. The prescribed value is set such that, for example, the first non-destructive read signal value from the start of the accumulation of charges is 40% of the pixel saturation signal level. FIG. 10 schematically shows how the change of the pixel signal of the first color component in accordance with the elapse of time differs by the amount of incident light. According to FIG. 10, when the amount of incident light is large (FIG. 10(*a*)), the pixel signal is saturated as the charge accumulation time period elapses. By contrast, when the amount of incident light is small, the level of the pixel signal does not reach the saturation level. As shown in FIG. 10(*b*), the level of the pixel signal increases approximately like a straight line. If, in such a case, the gain correction coefficient is determined with an assumption that the level of the signal changes as in FIG. 10(*a*) as the time elapses, the correction output of the first color component image when a long time elapses after the start of the accumulation of charges is unnaturally high as represented by the two-dot chain line in FIG. 10(*b*). In consideration of such an influence of the amount of incident light, the gain correction coefficient table 91 has two indices, namely, the elapsed time after the start of the accumulation of charges of the first color component image and the amount of time incident on the image sensor 201.

Table 1 shows an example of the correction coefficient table 91.

TABLE 1

| 1st frame signal voltage [mV] | Correction coefficient k | | | | |
|---|---|---|---|---|---|
| | 2nd frame | 3rd frame | 4th frame | 5th frame | 6th frame |
| 10 | 1.00 | 1.01 | 1.01 | 1.01 | 1.01 |
| 50 | 1.02 | 1.03 | 1.03 | 1.04 | 1.05 |
| 100 | 1.03 | 1.05 | 1.07 | 1.09 | 1.10 |
| 200 | 1.07 | 1.10 | 1.14 | 1.18 | 1.21 |

In Table 1, the "1st frame signal voltage" represents the pixel signal of the first color component when one-frame accumulation time period of the second color component has elapsed after the start of the accumulation of charges of the first color component image. The expressions "2nd frame" and "3rd frame" represent the frame numbers of the second color component after the start of the accumulation of charges of the first color component image. As shown in the table, when the first frame signal voltage of the first color component, the change of the gain correction coefficient small in accordance with the elapse of time is small; whereas when the first frame signal voltage is large, the gain correction coefficient significantly changes as the time elapses.

Referring to FIG. 9, the expected value table 94 and the comparison section 95 have a function of, when the amount of light incident on the image sensor 201 changes during the charge accumulation timer period of the first color component image, dynamically responding to the change. An operation of the expected value table 94 and the comparison section 95 will be described with reference to FIG. 11.

Figure 11:
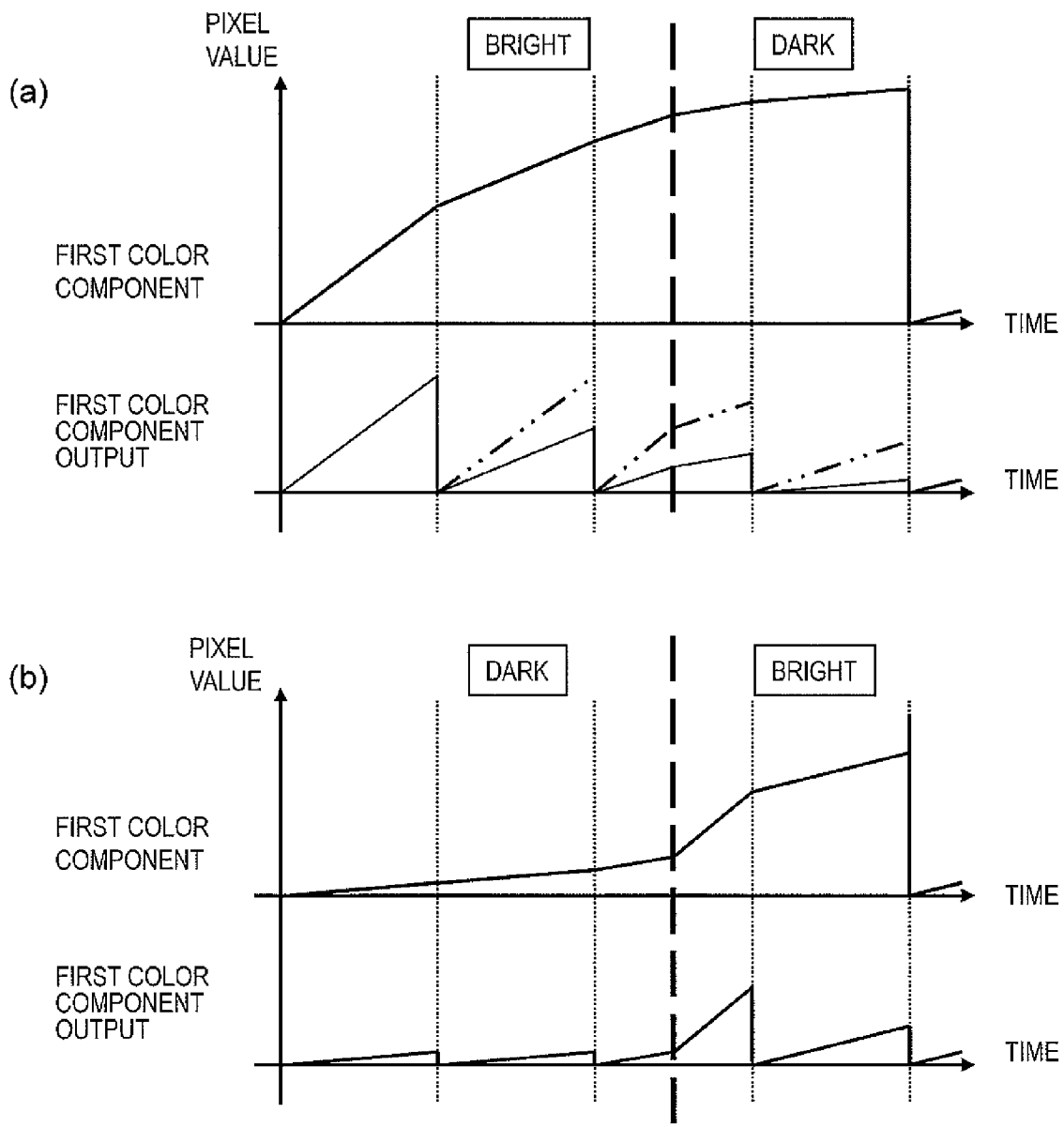
FIG. 11 provides views of conception showing how the accumulation state of a color component picked up at a long charge accumulation time period changes in the case where the amount of incident light changes during the charge accumulation time period.

FIG. 11 shows the pixel signal and the output from the subtraction section 223 when the amount of light incident on the image sensor 201 changes during the charge accumulation timer period of the first color component image. FIG. 11(*a*) shows the case where the amount of light incident on the image sensor 201 decreases from the start of the accumulation of charges, and FIG. 11(*b*) shows the case where the amount of light incident on the image sensor 201 increases from the start of the accumulation of charges.

Referring to FIG. 11(*b*), when the amount of incident light increases and the pixel signal reaches the saturation level during the accumulation of charges of the first color component image, the output from the subtraction section 223 decreases after the signal reaches the saturation level as shown in the bottom part of FIG. 11(*b*). In this case, if the gain correction coefficient selected by the gain correction coefficient selection section 92 at the start of the accumulation of charges of the first color component image is kept used, the degree of the gain correction decreases (see, for example, the coefficient values when the first frame signal value=10 mV in Table 1). As a result, the gain correction for the saturation of the pixel signal at the later non-destruction read is insufficient.

It is preferable that the expected value of the pixel signal in the case where the amount of incident light does not change during the charge accumulation time period of the first color component image is kept in the expected value table 94 and the expected value is compared against the output from the subtraction section 223 by the comparison section 95 at each non-destructive read of the first color component image. Owing to this, the change of the amount of incident light can be detected and an appropriate gain correction coefficient can be selected in accordance with the change. Similarly to the correction coefficient table 91, the expected value table 94 has two indices, namely, the elapsed time from the start of the accumulation of charges of the first color component image and the amount of light incident on the image sensor 201. Table 2 shows an example of the expected value table 94.

TABLE 2

| 1st frame signal voltage [mV] | Expected value $V_e$ [mV] | | | | |
|---|---|---|---|---|---|
| | 2nd frame | 3rd frame | 4th frame | 5th frame | 6th frame |
| 10 | 9.93 | 9.92 | 9.88 | 9.85 | 9.82 |
| 50 | 48.35 | 47.96 | 47.17 | 46.39 | 45.62 |
| 100 | 93.48 | 92.01 | 88.99 | 86.07 | 83.25 |
| 200 | 174.48 | 169.33 | 158.41 | 148.19 | 138.63 |

In Table 2, the expressions "1st frame signal voltage", "2nd frame" and the like represent the same as those in Table 1.

The correction coefficient table 91 and the expected value table 94 need to be set for each image sensor used in the image capture device according to the present invention because these tables rely on charge accumulation characteristics of the pixel in the image sensor 201 or characteristics of the amplifier in the image sensor 201. The correction coefficient table 91 and the expected value table 94 may be created based on the above-mentioned characteristics checked when, for example, the image sensor 201 is created.

Figure 12:
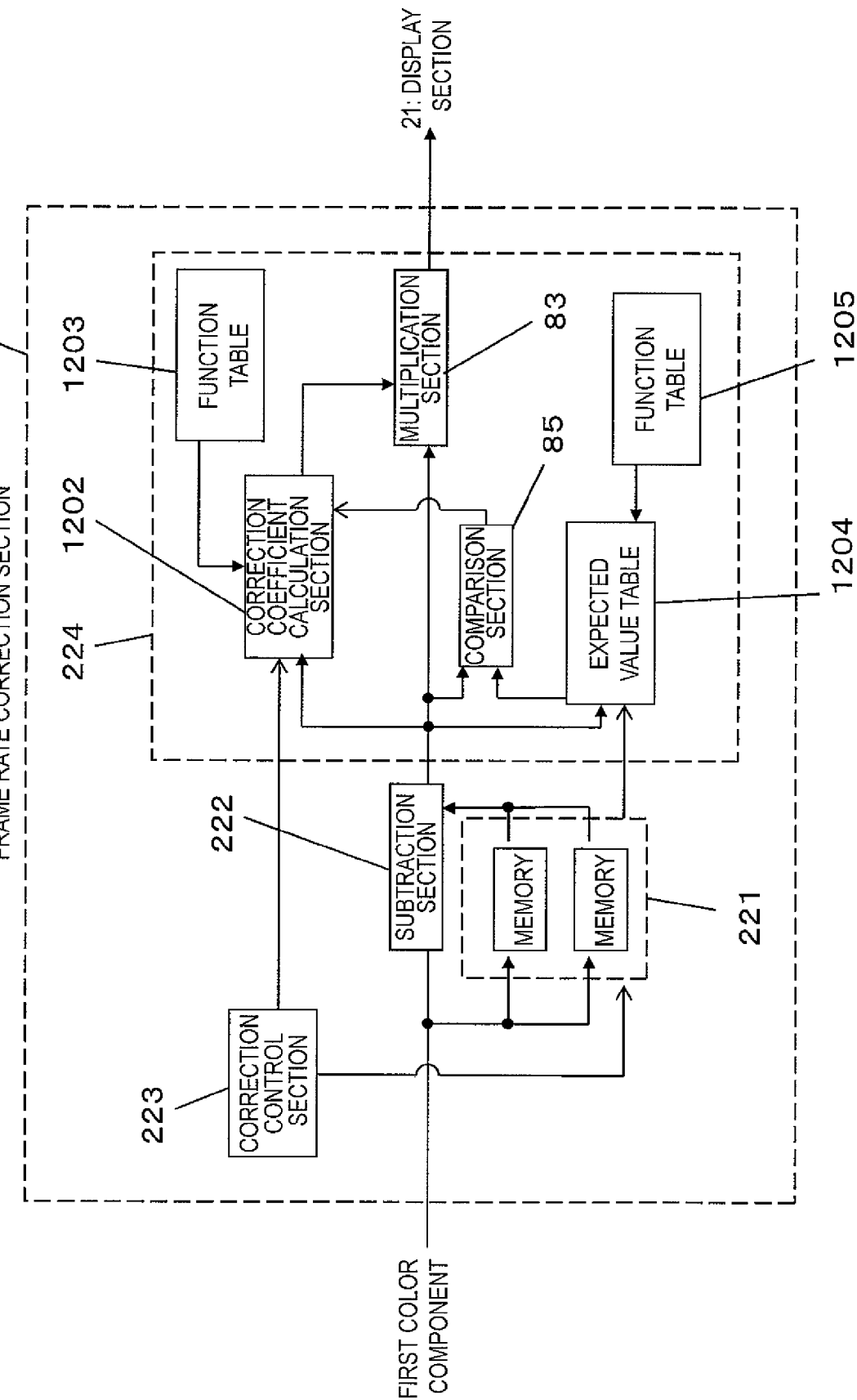
FIG. 12 is a block diagram showing a structure of a frame rate correction section including function tables in Embodiment 1 according to the present invention.

Instead of the correction coefficient table 91 and the expected value table 94, functions for calculating the coefficient value and the expected value of the image capture signal can be stored. The coefficient value and the expected value of the image capture signal may be calculated by the functions when the tables in this embodiment are referred to. FIG. 12 shows a block diagram of a frame rate correction section 1201 in the case where the tables have such a structure. Referring to FIG. 12, the gain correction section 224 includes a correction coefficient calculation section 1202, a function table 1203 for keeping a function calculating a gain correction coefficient, an expected value calculation section 1204, and a function table 1205 for keeping a function of calculating the image capture signal when the amount of light incident on the image sensor 201 does not change.

In this case, the gain correction coefficient (represented by "k") to be kept in the function table 1203 is given by, for example, the expression:

$$k = \frac{\alpha t}{1 - \exp(-\alpha t)} \quad \text{[Expression 1]}$$

where t represents the time elapsed from the start of the accumulation of charges of the first color component image, and $\alpha$ is a constant determined by the level of the first frame output voltage in Table 1. The expected value (represented by "Ve") of the image capture signal to be kept in the function table 1205 is given by, for example, the expression:

$$V_e = E(1 - \exp(-\alpha t)) \quad \text{[Expression 2]}$$

where E represents the power supply voltage of the pixel signal amplifier in the image sensor 201, t represents the time elapsed from the start of the accumulation of charges of the first color component image, and $\alpha$ is a constant determined by the level of the first frame output voltage in Table 2.

Expressions 1 and 2 are examples of representing the non-linearity when the input to the amplifier is large by an exponential function. The gain correction coefficient and the expected value of the image capture signal are determined for each pixel of the image sensor 201. Therefore, the gain correction coefficient and the expected value of the image capture signal are not limited to the expressions shown in Expressions 1 and 2, and need to be set for each image sensor used in an image capture device according to the present invention.

Owing to the structure of this embodiment, a color image in which different color components are picked up at different charge accumulation time periods has no color shift despite such different charge accumulation time periods for different color components. In addition, the color image can be generated without any large-scale image processing and displayed on a viewfinder of a camera or the like.

The display frame rate of a color image is adapted to the display frame rate of a color component image picked up at a short charge accumulation time period. Therefore, even when the motion of a subject is large, a color image with small motion blur can be generated. In addition, the gain correction section 224 in this embodiment can solve a problem that the luminance value of the first color component image decreases in accordance with the elapse of time.

In this embodiment, non-destruction read of the first color component is performed at a relatively high rate, whereas image capture of the first color component is performed at a long charge accumulation time period and a low frame rate. It is theoretically possible that the first color component is read by destructive read accompanying reset at the timing of, and instead of, the non-destruction read. When such image capture is performed at a short charge accumulation time period and a high frame rate and then image data is added for a plurality of frames, an image which is to be obtained by image capture at a long charge accumulation time period and a low frame rate can be obtained. However, an image obtained by adding image data obtained by a short accumulation time period includes more noise than an image actually obtained by a long charge accumulation time period. "Video Reconstruction of Different Resolution and Exposure-Time Video Sequences for High-Resolution and Well-Exposed Video Imaging", by Taro IMAGAWA, Takeo AZUMA, Tomokazu SATO, Naokazu YOKOYA, Journal of the Institute of Image Information and Television Engineers, Vol. 63, No. 8, pp. 1139-1148, 2009 (Hereinafter, Non-Patent Document 2) explains noise which is mixed in an image actually obtained by image capture performed at a long exposure time period and an image obtained by digitally adding images obtained at a short accumulation time period. According to this document, an image obtained by digital addition includes noise of a level which is about three times the level of the noise mixed in an image obtained by a long accumulation time period.

In this embodiment, an image of the first color component is actually obtained at a sufficiently long charge accumulation time period (low frame rate image), and an image required for real-time display is acquired by non-destructive read.

Embodiment 2

Now, an image capture device in Embodiment 2 according to the present invention will be described. The image capture device in this embodiment has a structure by which it can be selected whether or not to perform a gain correction operation described in Embodiment 1 in accordance with the length of the charge accumulation time period of the first color component image.

Figure 13:
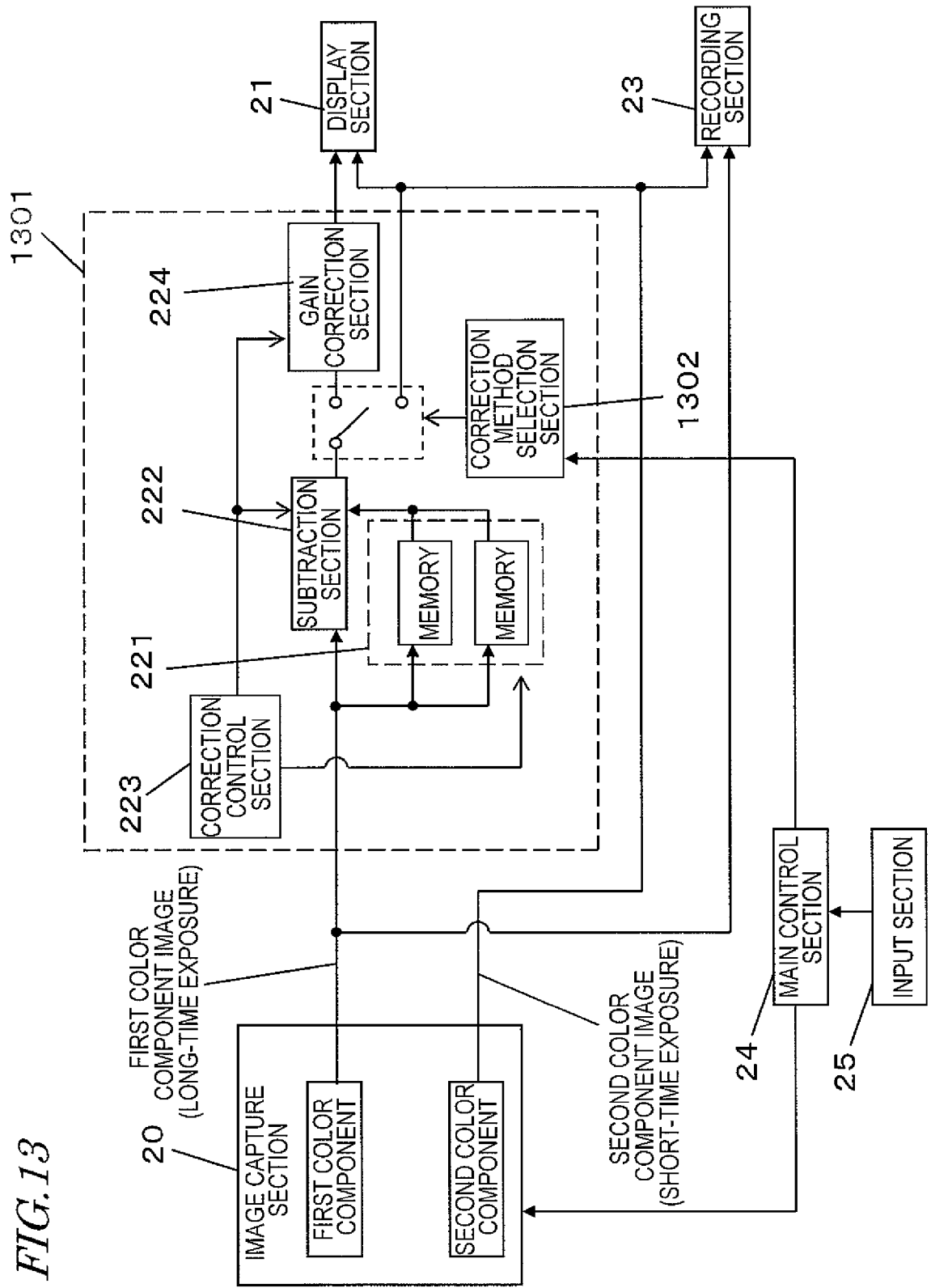
FIG. 13 is a block diagram showing a structure of a frame rate correction section in Embodiment 2 according to the present invention.

FIG. 13 is a block diagram showing a structure of an image capture device in this embodiment. The image capture section 20, the storage section 221, the subtraction section 222, the correction control section 223, the gain correction section 224 and the display section 21 in the figure respectively have the same functions as the corresponding elements in Embodiment 1. A difference between this embodiment and Embodiment 1 is that a frame rate correction section 1301 in this embodiment includes a correction method selection section 1302.

Based on the image shooting conditions input to the input section 25 by the user, the main control section 24 determines the frame rate of the first color component image and the frame rate of the second color component image. This defines the length of the charge accumulation time period of the first color component image. The correction method selection section 1302 selects whether or not to perform the operation of the gain correction section 224 in accordance with the length of the charge accumulation time period of the first color component image. When the charge accumulation time period of the first color component image is short, for example, when the charge accumulation time period of the first color component image is equal to the accumulation time period of two frames of the second color component image, the pixel signal of the first color component is reset before the influence of saturation becomes conspicuous. In this case, there is no need to perform the gain correction operation. Therefore, the correction method selection section 1302 can act so that the gain correction section 224 does not operate. Specifically, the correction method selection section 1302 supplies the output from the subtraction section 222 to the display section 21 as it is.

Owing to the structure of this embodiment, the gain correction operation on the pixel signal of the first color component, which is performed in Embodiment 1 at each read of the second color component, can be omitted. Therefore, display delay accompanying the generation of an image can be further decreased.

Embodiment 3

Now, an image capture device in Embodiment 3 according to the present invention will be described.

The image capture device in this embodiment includes a frame rate correction section (first frame rate correction section) 22 for adapting the frame rate of the first color component image to the frame rate of the second color component image, and a second frame rate correction section 1402 for adapting the frame rate of the second color component image to the frame rate of the first color component image. Thus, either the first frame rate correction section 22 or the second frame rate correction section 1402 is selectable in accordance with the magnitude of the motion of the subject.

Figure 14:
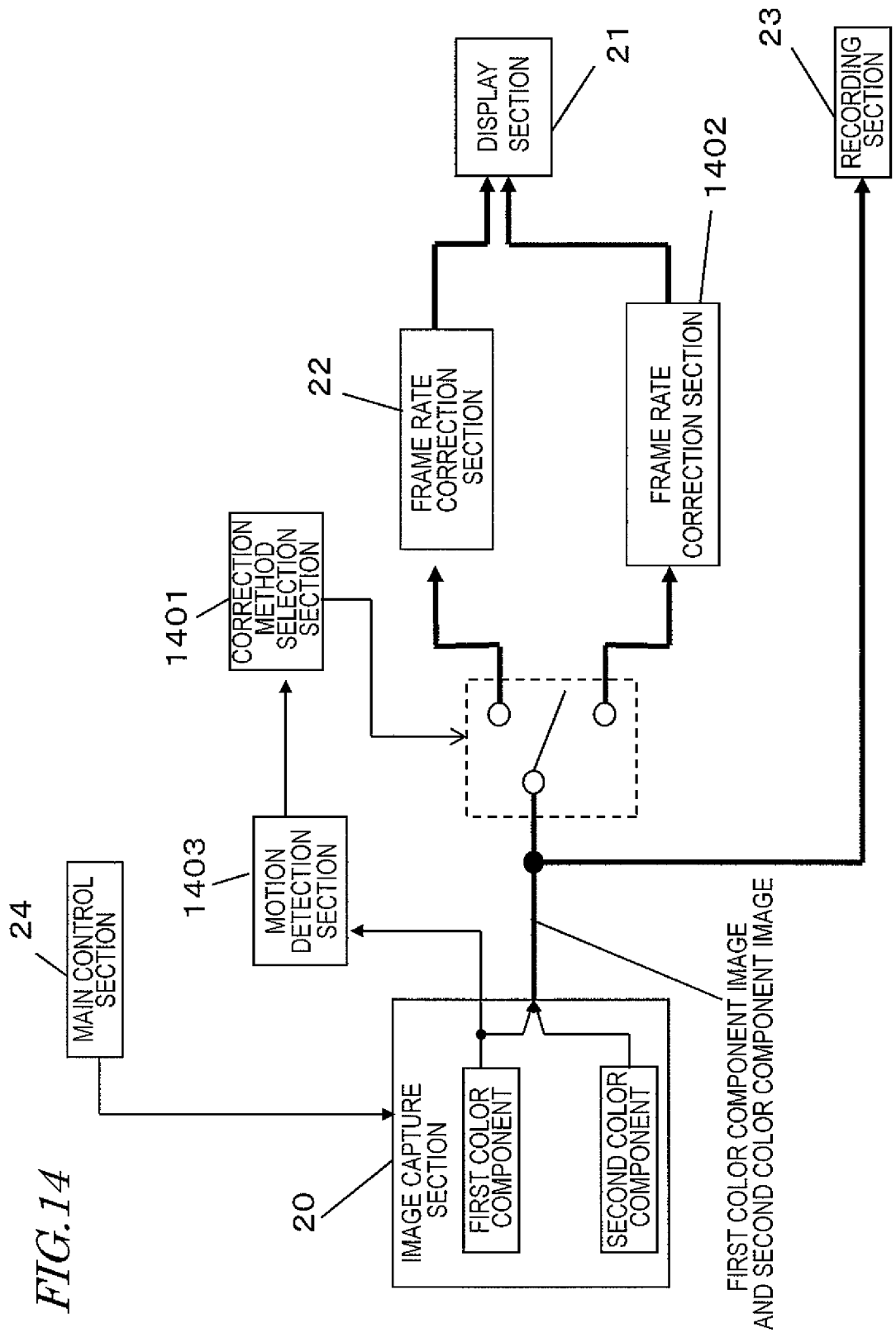
FIG. 14 is a block diagram showing a structure of an image capture device and an image capture and display device in Embodiment 3 according to the present invention.

FIG. 14 is a block diagram showing a structure of the image capture device in this embodiment, The image capture device in this embodiment includes the frame rate correction section 1402 for adapting the frame rate of the second color component image to the frame rate of the first color component image in addition to the frame rate correction section 22 described in Embodiments 1 and 2. The image capture device in this embodiment also includes a correction method selection section 1401 and a motion detection section 1403 for selecting which of the two frame rate correction sections 22 and 1402 is to be used.

The frame rate for displaying the second color component image can be adapted to the frame rate of the first color component image by, for example, adding second color component images of a plurality of frames which have been read during the relatively long charge accumulation time period of the first color component. By contrast, the frame rate for displaying the first color component image can be adapted to the frame rate of the second color component image by operating the frame rate correction section 22 described in Embodiments 1 and 2.

In this embodiment, the correction method selection section 1401 determines the frame rate of the image data to be supplied to the display section 21 based on a detection result of the motion detection section 1403. More specifically, when the motion of the subject is small, the frame rate of the second color component image is adapted to the frame rate of the first color component. By contrast, when the motion of the subject is large, the frame rate of the first color component image is adapted to the frame rate of the second color component.

The motion detection section 1403 detects a motion (optical flow) by an existing known technique such as, for example, block matching, gradient method, phase correlation method or the like. An example of method for automatically detecting the magnitude of the motion will be described.

Figure 17A:
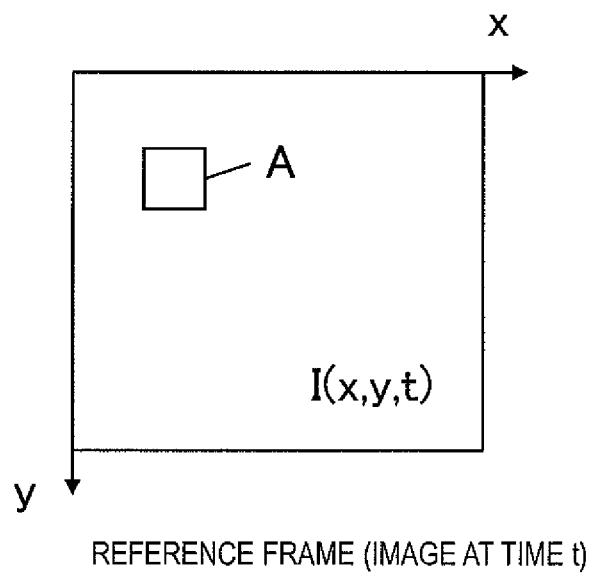
FIGS. 17A and 17B provide views of conception regarding a motion detection operation in Embodiment 3 according to the present invention.

FIGS. 17A and 17C respectively show a reference frame and a comparison frame used for performing motion detection by block matching. The motion detection section 1403 sets a window zone A shown in FIG. 17A in a frame as a reference (t'th frame paid attention to find the motion), and makes a search in the comparison frame to find a pattern similar to the pattern in the window zone. As the comparison frame, for example, the frame next to the frame paid attention is often used.

Figure 17B:
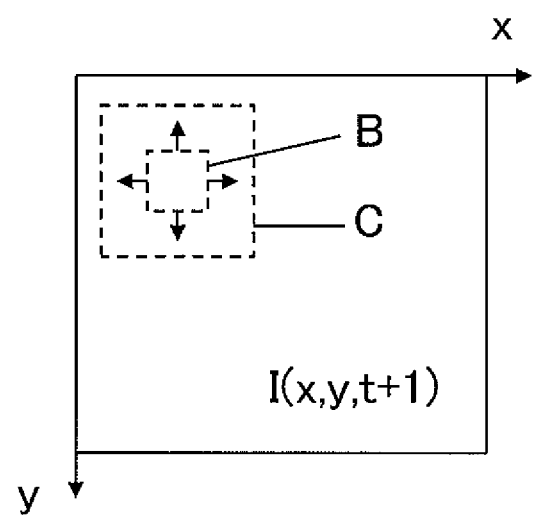

As shown in FIG. 17B, the range for search is usually set to a certain range (C in FIG. 17B) predetermined based on position B at which the moving distance is zero. The degree (extent) of similarity between the patterns is evaluated by calculating, as the evaluation value, the sum of square differences (SSD) shown represented by expression 3 or the sum of absoluted differences (SAD) represented by expression 4.

$$SSD = \sum_{x,y \in W} (I(x+u, y+v, t+1) - I(x, y, t))^2 \quad \text{[Expression 3]}$$

$$SAD = \sum_{x,y \in W} |I(x+u, y+v, t+1) - I(x, y, t)| \quad \text{[Expression 4]}$$

In expressions 3 and 4, I(x, y, t) represents the signal value of the pixel at the position (x, y) in the frame and the frame number t. x,y∈W represents the coordinate value of the pixel included in the window zone of the reference frame.

The motion detection section 1403 changes (u, v) in the range for search to find a set of (u, v) at which the evaluation value is minimum. The resultant set of (u, v) is set as an inter-frame motion vector V. By subsequently shifting the position of the window zone, the motion is found in units of pixels or in unit of blocks (e.g., 8 pixels×8 pixels).

For selecting the frame rate correction method by automatically detecting the magnitude of the motion, automatic selection is made as follows, for example. When an average value of the magnitudes of motions, found by the above-described method, of all the pixels in the image which has been obtained by expression 5 below is 8 pixels or greater, the frame rate correction section 22 is used; whereas when the average value is smaller than 8 pixels, the frame rate correction section 1402 is used.

$$u_{mean}(t) = \frac{1}{N} \sum_{x,y \in \Omega} \sqrt{u(x, y, t)^2 + v(x, y, t)^2} \quad \text{[Expression 5]}$$

In expression 5, umean(t) represents the average value of the magnitudes of the motions of all the pixels in the t'th frame, N represents the total number of the pixels in one frame, and Ω represents the coordinate values of all the pixels in one frame.

In this embodiment, the same method among the two frame rate correction methods may be selected for the entirety of the input image, or different methods may be selected for different parts of the input image. Different methods can be selected for different parts of the input image by a structure in which, for example, umean(t) in expression 5 is found for each of image blocks having a certain size, not for the entirety of the image, and a block having umean(t) of 8 pixels or greater is input to the frame rate correction section 22 and a block not having umean(t) of 8 pixels or greater is input to the frame rate correction section 1402.

In this embodiment, when the motion of the subject is small, the frame rate of the second color component image is adapted to the frame rate of the first color component image. Thus, a color image having a high S/N ratio as a result of charge accumulation being conducted sufficiently can be obtained. Since the motion of the subject is small, even when the charge accumulation time period is long, the motion blur is not conspicuous in the color image which is output to the display section 21.

Embodiment 4

Now, an image capture device in Embodiment 4 will be described.

In this embodiment, the image capture device includes an image recovery section in addition to the frame rate correction section described in Embodiment 1 or 2. Based on an instruction from the user on the usage of the image capture and display device in this embodiment, for example, on whether the device is used for recording or for reproduction, either the frame rate correction section or the image recovery section is selectable.

Figure 15:
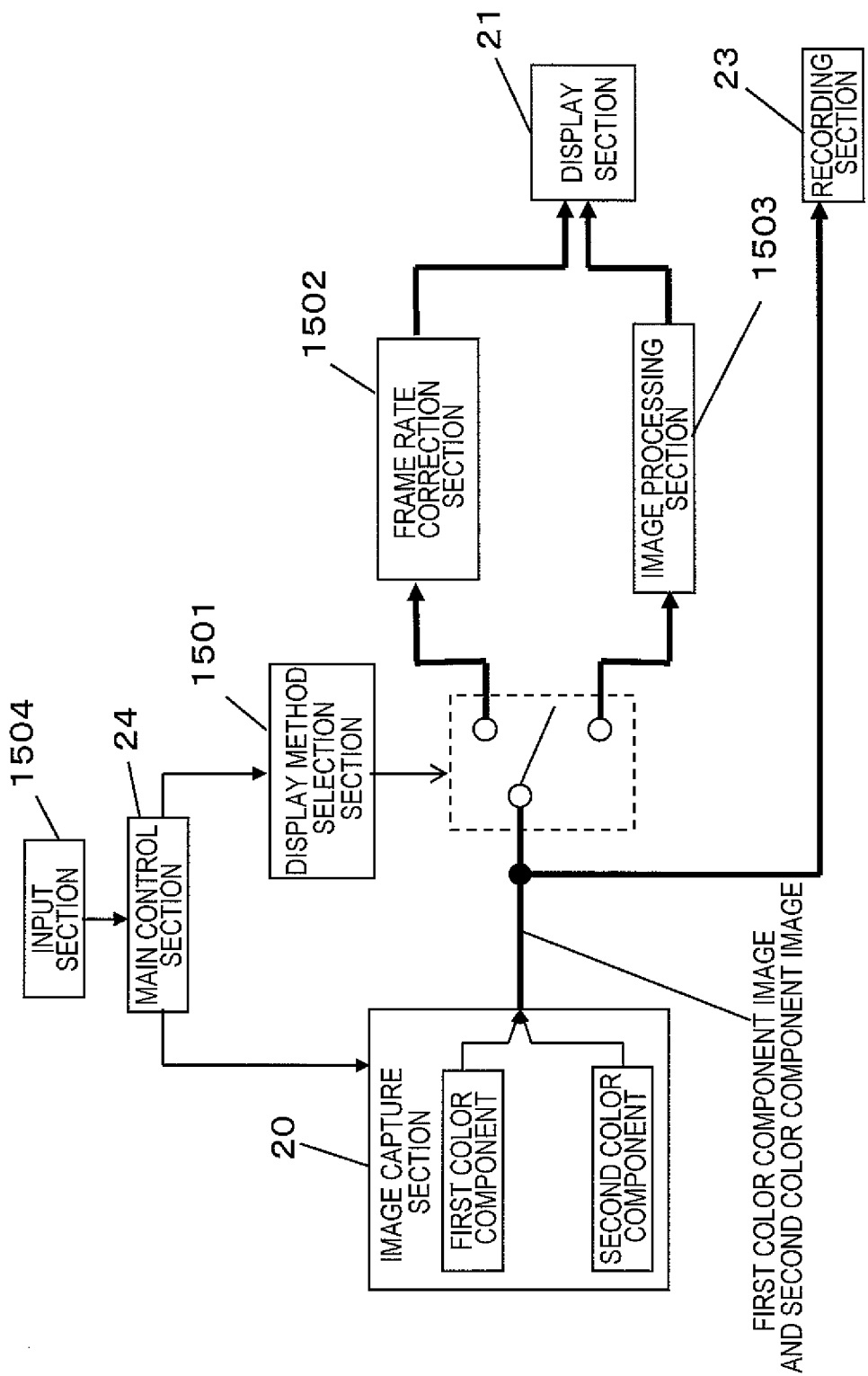
FIG. 15 is a block diagram showing a structure of an image capture device and an image capture and display device in Embodiment 4 according to the present invention.

FIG. 15 is a block diagram showing a structure of the image capture device in this embodiment. In this embodiment, the image capture device includes a frame rate correction section 1502 having substantially the same structure as that of the frame rate correction section described in Embodiment 1 or 2, an image processing section 1503 for performing processing of increasing the frame rate of the first color component image to a high level, and a display method selection section 1501 for selecting which of the frame rate correction section 1502 and the image processing section 1503 is to be used. The image capture device in this embodiment also includes an input section 1504 for receiving an instruction from the user on whether to perform recording or reproduction and transmitting the instruction to the main control section 24.

Figure 18:
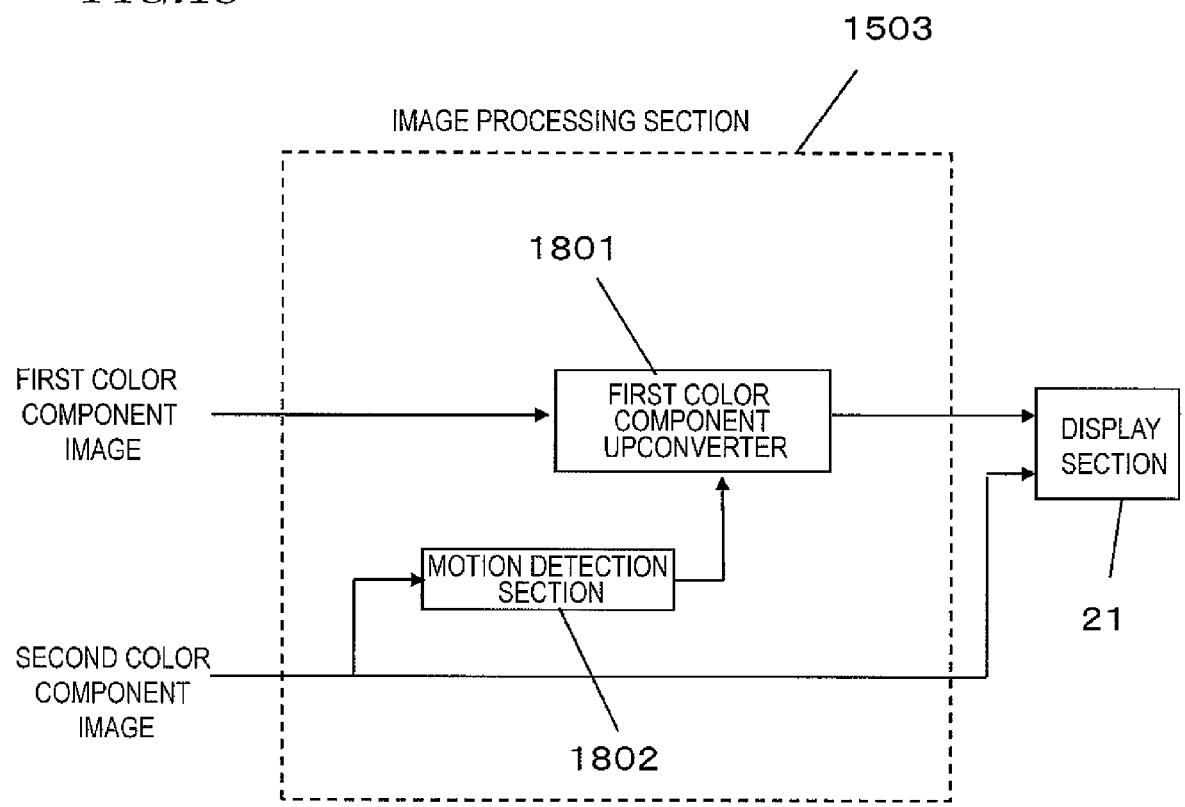
FIG. 18 is a block diagram showing a structure of an image recovery section in Embodiment 4 according to the present invention.

With reference to FIG. 18, an example of operation of the image processing section 1503 will be described. The structure and operation of the image processing section 1503 may be substantially the same as those of devices disclosed in WO2009/019823 and WO2009/019824. Herein, the entirety of the disclosures of WO2009/019823 and WO2009/019824 is incorporated by reference.

In the example shown in FIG. 18, in this embodiment, the image processing section 1503 includes a first color component upconverter 1801 for performing processing of adapting the display frame rate of the first color component image to the second color component image, and a motion detection section 1802 for detecting a motion from the second color component image.

The operation of the image processing section 1503 is to perform processing of spatio-temporally separating the first color component image based on the motion found by the motion detection section 1802 by use of, for example, expression 3 or 4 mentioned above. A recovered image gH of a first color component image gL is found as gH, which minimizes the following expression 6.

$$J = \|Hg_H - g_L\|^2 + \lambda_s \|Q_s g_H\|^2 + \lambda_m \|Q_m g_H\|^2 \quad \text{[Expression 6]}$$

where gH and gL each represent a vertical vector having each of pixels of the motion picture as an element, H represents the matrix which is a model of addition of light by long-time exposure, λs represents the weight on smoothness constraint, Qs represents the smoothness constraint, λm represents the weight on dynamic constraint, and Qm represents the matrix which is a model of dynamic constraint. gH and gL are vectors obtained by arraying pixel values at all the positions and in all the frames of the motion picture.

Hereinafter, expressions 7, 8 and 9 represent detailed expressions of each term of the right side of expression 6.

$$Hg_H(x, y, t) = \sum_{t'=0}^{3} g_H(x, y, t+t') \quad \text{[Expression 7]}$$

$$Q_s g_H(x, y, t) = \sum_{x=1}^{x_{max}-1} \{2 \cdot g_H(x, y, t) - g_H(x+1, y, t) - g_H(x-1, y, t)\}^2 + \sum_{y=1}^{y_{max}-1} \{2 \cdot g_H(x, y, t) - g_H(x, y+1, t) - g_H(x, y-1, t)\}^2 \quad \text{[Expression 8]}$$

$$Q_m g_H(x, y, t) = \sum_{x=0}^{x_{max}} \sum_{y=0}^{y_{max}} \sum_{t=0}^{t_{max}} \{g_H(x+u(x, y, t), y+v(x, y, t), t+1) - g_H(x, y, t)\}^2 \quad \text{[Expression 9]}$$

In expressions 7, 8 and 9 mentioned above, gH(x, y, t), HgH(x, y, t), QsgH(x, y, t) and QmgH(x, y, t) are respectively the elements corresponding to the positions (x, y) of gH, HgH, QsgH and QmgH in expression 6 and the frame number t. In expressions 8 and 9, xmax, ymax and tmax respectively represent the pixel number in the x direction, the pixel number in the y direction and the maximum value of the frame number. In expression 9, u(x, y, t) and v(x, y, t) represent magnitudes of the motion in the x direction and the y direction at the pixel position at the position (x, y) and the frame number t. The magnitudes of the motion are found by the motion detection section 1802. The motion detection section 1802 detects a motion by, for example, the method described in Embodiment 3. In expression 7, it is assumed that the charge accumulation time period of the first color component image is four times the charge accumulation time period of the second color component image, but the present invention is not limited to such a value.

The first color component upconverter 1801 obtains gH, which minimizes expression 6, based on the following expression 10.

$$\frac{\partial J}{\partial g_H} = 2H^T(Hg_H - g_L) + 2\lambda_s Q_s^T Q_s g_H + 2\lambda_m Q_m^T Q_m g_H = 0 \quad \text{[Expression 10]}$$

As a result, the first color component upconverter 1801 obtains gH by solving the simultaneous equation represented by expression 11.

$$(H^T H + \lambda_s Q_s^T Q_s + \lambda_m Q_m^T Q_m) g_H = H^T g_L \quad \text{[Expression 11]}$$

Expression 11 can be solved by use of an existing numerical value calculation method (method for solving a simultaneous expression) such as a conjugate gradient method, a steepest descent method or the like.

In this embodiment, in the case where an image output from the image capture device is not to be used for checking the subject during the image capture, but is to be reproduced for appreciation after the image is recorded, a higher quality color image can be displayed than when the frame rate correction section described in Embodiment 1 is used. The frame rate may be increased to a high level by the image processing section 1503 incorporated into the image capture device, or by an external computation device after the picked up image is transferred from the recording section 23 to the external computation device. Even in the case where the frame rate is increased to a high level by the image processing section 1503, the processing is performed on a recorded color image. Therefore, the processing does not need to be performed in real time. Thus, as compared with the case where the frame rate is increased to a high level in real time, the circuit scale required for the processing can be reduced.

The image processing section 1503 in this embodiment may be incorporated into any of the image capture devices in Embodiments 1 through 3 and used to read and process data from the recording section 23. In this case, the color image obtained by the image processing section 1503 may be displayed on an external display device after the image capture is finished. The image processing section 1503 may be used to process data, read from the recording section 23 of any of the image capture devices in Embodiments 1 through 3, outside the image capture. The structure and the operation of the image processing section 1503 is not limited to those described above.

Embodiment 5

FIG. 16 shows an example of flowchart of a computer program in this embodiment.

The computer program in this embodiment is a set of instructions for causing a processor, included in the image capture device described in each of the above-described embodiments, execute various steps. In the above embodiments, the frame rate correction sections 22, 1201, 1301 and 1402 include the subtraction section 222, the gain correction section 224 and other elements. These elements may be realized by specific hardware or a combination of hardware and software. In this embodiment, at least a part of the above-described elements may be realized by a processor included in the image capture device.

The computer program in this embodiment has a feature in having the processor execute a step of receiving, from the image capture device in each of the above-described embodiments, a pixel signal of a first color component obtained by non-destructive read and a pixel signal of a second color component obtained by read at a second frame rate; and a step of subtracting a signal obtained by immediately previous non-destructive read from a signal obtained by non-destructive read immediately subsequent thereto to find a difference value and outputting the difference value at the second frame rate.

A method executed by the processor in accordance with the computer program in a preferable embodiment according to the present invention includes a display method selection step 1601 of selecting whether an image on the display section is to be used for checking the subject at the time of image capture or is to be reproduced as a recorded motion picture; a correction method selection step 1602 of selecting a frame rate correction method in accordance with the magnitude of the motion of the subject; a subtraction step 1603 of finding a difference of a first color component signal obtained by non-destructive read; a gain correction step 1604 of performing gain correction on an output of the subtraction step; a frame rate correction step 1605 of correcting the frame rate of the second color component image to a frame rate which is the same as that of the first color component image; and a frame rate increasing step 1606 of generating a high frame rate color image from the first and second color component images.

The operation of the display method selection step 1601 is the same as the operation of the display method selection section 1501 in Embodiment 4. The operation of the correction method selection step 1602 is the same as the operation of the correction method selection section 1401 in Embodiment 3. The operation of the subtraction step 1603 is the same as the operation of the subtraction section 223 in Embodiment 1. The operation of the gain correction step 1604 is the same as the operation of the gain correction section 224 in Embodiment 1. The operation of the frame rate correction step 1605 is the same as the operation of the frame rate correction section 1402 in Embodiment 3. The operation of the frame rate increasing step 1606 is the same as the operation of the image recovery section 1503 in Embodiment 4.

It is not necessary to execute all the steps mentioned above by the processor, and the steps may be partially executed by dedicated hardware. This program is existent as being stored on a recording medium (a non-transitory medium).

The present invention is usable as an image capture and display device for displaying a color motion picture picked up by different exposure time periods (charge accumulation time periods) for the first color component and the second color component, as well as a video device or system, a video synthesis device, a video editing device, an image recovery device or the like having such an image capture and display device incorporated therein. The present invention is also realized as a computer program.

While the present invention has been described with respect to preferred embodiments thereof, it will be apparent to those skilled in the art that the disclosed invention may be modified in numerous ways and may assume many embodiments other than those specifically described above. Accordingly, it is intended by the appended claims to cover all modifications of the invention that fall within the true spirit and scope of the invention.

What is claimed is:

1. An image capture device, comprising:
an image capture section for reading a pixel signal of a first color component at a first frame rate and reading a pixel signal of a second color component other than the first color component at a second frame rate which is higher than the first frame rate, the image capture section being configured to perform non-destructive read of the pixel signal of the first color component in synchronization with the timing at which the pixel signal of the second color component is read during a charge accumulation time period defined by the first frame rate;
a recording medium for recording the pixel signal of the first color component obtained by the read at the first frame rate and the pixel signal of the second color component obtained by the read at the second frame rate;
a display section; and
a frame rate correction section capable of supplying a color image to be displayed on the display section at the time of image capture at the second frame rate by use of the pixel signal of the first color component obtained by the non-destructive read and the pixel signal of the second color component obtained by the read at the second frame rate, wherein the frame rate correction section includes:
a memory for storing the pixel signal obtained by the non-destructive read; and
a subtraction section for subtracting a pixel signal obtained by immediately previous non-destructive read from a pixel signal obtained by non-destructive read immediately subsequent thereto based on the pixel signals stored on the memory to find a difference value and outputting the difference value at the second frame rate.

2. The image capture device of claim 1, wherein the image capture section includes:
an image sensor for reading the pixel signal of the first color component and the pixel signal of the second color component, the image sensor being configured to perform non-destructive read of a pixel signal; and
an image capture control section configured to control the image sensor to read the pixel signal of the first color component at the first frame rate and to read the pixel signal of the second color component at the second frame rate which is higher than the first frame rate, wherein the image capture control section controls the image sensor to perform non-destructive read of the pixel signal of the first color component in synchronization with the timing at which the pixel signal of the second color component is read during the charge accumulation time period defined by the first frame rate.

3. The image capture device of claim 1, wherein the frame rate correction section includes a gain correction section for correcting the difference value in accordance with a saturation characteristic between time elapsed from start of the charge accumulation time period in the image sensor and a signal output from the image sensor.

4. The image capture device of claim 3, wherein the gain correction section has a gain adjusting function of correcting so that the output from the subtraction section does not decrease in accordance with the elapse of time from the start of the charge accumulation time period, wherein the gain correction section performs the correction in synchronization with the timing at which the pixel signal of the second color component is read.

5. The image capture device of claim 3, wherein:
the gain correction section includes:
 a correction coefficient table having two indices of time elapsed from the start of the charge accumulation time period of the pixel signal of the first color component and an amount of incident light;
 a correction coefficient selection section for selecting a gain correction coefficient from the gain correction coefficient table based on the elapsed time and the amount of incident light; and
 a multiplication section for multiplying the gain correction coefficient by the pixel signal of the first color component obtained by the non-destructive read;
wherein the gain correction section performs the correction so as to maintain a signal strength balance of the color components of the color image in accordance with the elapsed time and the amount of incident light.

6. The image capture device of claim 3, wherein:
the gain correction section includes:
 an image capture signal table in the case where the amount of light incident on the image capture device does not change; and
 a comparison section for comparing the output from the subtraction section and a value in the image signal table;
wherein the gain correction section detects a difference between the output from the subtraction section and the value in the image signal table at the non-destructive read of the pixel signal of the first color component to select the gain correction coefficient such that the balance among the color components is maintained even when the amount of incident light changes during the charge accumulation.

7. The image capture device of claim 6, wherein:
the gain correction section includes a function table to which an output pixel signal of the first color component is input; and
the gain correction section is capable of calculating an image capture signal in the case where neither gain correction coefficient nor the amount of incident light changes at the time of the non-destructive read of the pixel signal of the first color component, based on the function kept in the function table.

8. The image capture device of claim 3, wherein the frame rate correction section includes a correction selection section for selecting whether or not to perform an operation of the gain correction in accordance with the length of the charge accumulation time period of the pixel signal of the first color component.

9. The image capture device of claim 1, wherein the first color component is green and the second color component is red and blue.

10. The image capture device of claim 1, wherein the image capture section includes:
 a light separation element for separating the incident light into light of the first color component and light of the second color component;
 a first solid-state image sensor for receiving the light of the first color component; and
 a second solid-state image sensor for receiving the light of the second color component.

11. The image capture device of claim 1, wherein the image capture section includes a solid-state image sensor in which a plurality of pixels for receiving light of the first color component and a plurality of pixels for receiving light of the second color component are arrayed in one image capture plane.

12. The image capture device of claim 1, further comprising:
 a second frame rate correction section for performing addition of the pixel signal of the second color component in units of frames, so as to adapt the frame rate of the pixel signal of the second color component to the frame rate of the pixel signal of the first color component; and
 a correction method selection section for selecting one of the two frame rate correction sections in accordance with a magnitude of a motion of a subject.

13. The image capture device of claim 1, further comprising:
 an image recovery section for performing spatio-temporal separation of an image of the pixel signal of the first color component based on motion information on the pixel signal of the second color component; and
 a display method selection section for selecting whether to generate a color motion picture to be displayed on the display section by the frame rate correction section or by the image recovery section in accordance with whether a user selects a recording function or a reproduction function.

14. An image generation method, comprising the steps of:
capturing an image by reading a pixel signal of a first color component at a first frame rate and reading a pixel signal of a second color component other than the first color component at a second frame rate which is higher than the first frame rate;
performing non-destructive read of the pixel signal of the first color component in synchronization with the timing at which the pixel signal of the second color component is read during a charge accumulation time period defined by the first frame rate;
recording, on a recording medium, the pixel signal of the first color component obtained by the read at the first frame rate and the pixel signal of the second color component obtained by the read at the second frame rate; and
displaying a color image on a display section at the time of image capture at the second frame rate by use of the pixel signal of the first color component obtained by the non-destructive read and the pixel signal of the second color component obtained by the read at the second frame rate, wherein the step of displaying the color image includes a step of subtracting a signal obtained by immediately previous non-destructive read from a signal obtained by non-destructive read immediately subsequent thereto to find a difference value and outputting the difference value at the second frame rate.

15. The image generation method of claim 14, wherein the step of displaying the color image includes a gain correction step of correcting the difference value in accordance with a saturation characteristic between time elapsed from start of the charge accumulation time period and a signal output from an image sensor.

16. An image generation method, comprising the steps of:
capturing an image by reading a pixel signal of a first color component at a first frame rate and reading a pixel signal of a second color component other than the first color component at a second frame rate which is higher than the first frame rate;
performing non-destructive read of the pixel signal of the first color component in synchronization with the timing at which the pixel signal of the second color component is read during a charge accumulation time period defined by the first frame rate;
recording, on a recording medium, the pixel signal of the first color component obtained by the read at the first frame rate and the pixel signal of the second color component obtained by the read at the second frame rate;
selecting whether to display a color image on a display section at the time of image capture at the second frame rate by use of the pixel signal of the first color component obtained by the non-destructive read and the pixel signal of the second color component obtained by the read at the second frame rate or to display an image on the display section by use of the pixel signal of the first color component obtained by the read at the first frame rate; and
displaying an image on the display section by use of the selected signal or signals, wherein the displaying the color image on the display section at the time of image capture at the second frame rate by use of the pixel signal of the first color component obtained by the non-destructive read and the pixel signal of the second color component obtained by the read at the second frame rate includes a step of subtracting a signal obtained by immediately previous non-destructive read from a signal obtained by non-destructive read immediately subsequent thereto to find a difference value and outputting the difference value at the second frame rate.

17. A computer program, stored on a non-transitory medium, for causing a processor that is included in an image processing device to generate motion picture data, the computer program causing the processor to execute the steps of:
receiving a pixel signal of a first color component obtained by non-destructive read and a pixel signal of a second color component obtained by read at a second frame rate from the image capture device of claim 1; and
subtracting a pixel signal obtained by immediately previous non-destructive read from a pixel signal obtained by non-destructive read immediately subsequent thereto to find a difference value and outputting the difference value at the second frame rate.

18. The computer program of claim 17, wherein the computer program further has the processor execute the step of correcting the difference value in accordance with a saturation characteristic between time elapsed from start of a charge accumulation time period and a signal output from an image sensor.

19. A non-transitory medium storing the computer program of claim 17 thereon.

* * * * *